(12) United States Patent
Marculescu et al.

(10) Patent No.: US 11,367,149 B2
(45) Date of Patent: Jun. 21, 2022

(54) PATTERN IDENTIFICATION IN TIME-SERIES SOCIAL MEDIA DATA, AND OUTPUT-DYNAMICS ENGINEERING FOR A DYNAMIC SYSTEM HAVING ONE OR MORE MULTI-SCALE TIME-SERIES DATA SETS

(71) Applicant: Carnegie Mellon University, Pittsburgh, PA (US)

(72) Inventors: Radu Marculescu, Pittsburgh, PA (US); Huan-Kai Peng, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1154 days.

(21) Appl. No.: 15/406,268

(22) Filed: Jan. 13, 2017

(65) Prior Publication Data

US 2017/0206470 A1 Jul. 20, 2017

Related U.S. Application Data

(60) Provisional application No. 62/388,074, filed on Jan. 15, 2016.

(51) Int. Cl.
*G06N 20/00* (2019.01)
*G06N 7/00* (2006.01)
(Continued)

(52) U.S. Cl.
CPC ............. *G06Q 50/01* (2013.01); *G06N 7/005* (2013.01); *G06N 20/00* (2019.01); *G06N 20/10* (2019.01);
(Continued)

(58) Field of Classification Search
CPC ........ G06N 20/00; G06N 20/10; G06N 7/005; G06Q 30/0282; G06Q 50/01; H04L 51/16; H04L 51/32; H04L 67/22
See application file for complete search history.

(56) References Cited

U.S. PATENT DOCUMENTS

2016/0171380 A1\* 6/2016 Kennel ................. G06N 7/005
706/12
2016/0206250 A1\* 7/2016 Sharma ................. G16H 15/00

OTHER PUBLICATIONS

Lin, Huijie, et al. "User-level psychological stress detection from social media using deep neural network." Proceedings of the 22nd ACM international conference on Multimedia. 2014. pp. 507-516 (Year: 2014).\*

(Continued)

*Primary Examiner* — Li B. Zhen
*Assistant Examiner* — Henry Nguyen
(74) *Attorney, Agent, or Firm* — Downs Rachlin Martin PLLC

(57) ABSTRACT

In some aspects, computer-implemented methods of identifying patterns in time-series social-media data. In an embodiment, the method includes applying a deep-learning methodology to the time-series social-media data at a plurality of temporal resolutions to identify patterns that may exist at and across ones of the temporal resolutions. A particular deep-learning methodology that can be used is a recursive convolutional Bayesian model (RCBM) utilizing a special convolutional operator. In some aspects, computer-implemented methods of engineering outcome-dynamics of a dynamic system. In an embodiment, the method includes training a generative model using one or more sets of time-series data and solving an optimization problem composed of a likelihood function of the generative model and a score function reflecting a utility of the dynamic system. A result of the solution is an influence indicator corresponding to intervention dynamics that can be applied to the dynamic system to influence outcome dynamics of the system.

15 Claims, 22 Drawing Sheets

(51) Int. Cl.
  *G06N 20/10* (2019.01)
  *G06Q 50/00* (2012.01)
  *H04L 67/50* (2022.01)
  *H04L 51/52* (2022.01)
  *H04L 51/00* (2022.01)

(52) U.S. Cl.
  CPC .............. *H04L 51/16* (2013.01); *H04L 51/32* (2013.01); *H04L 67/22* (2013.01)

(56) References Cited

OTHER PUBLICATIONS

Gal, Yarin, and Zoubin Ghahramani. "Bayesian convolutional neural networks with Bernoulli approximate variational inference." arXiv preprint arXiv:1506.02158 (2015). (Year: 2015).*

Strigl, Daniel, Klaus Kofler, and Stefan Podlipnig. "Performance and scalability of GPU-based convolutional neural networks." 2010 18th Euromicro Conference on Parallel, Distributed and Network-based Processing. IEEE, 2010. (Year: 2010).*

Bhatia, Shweta, and Sweety Patel. "Analysis on different Data mining Techniques and algorithms used in IOT." Int. J. Eng. Res Appl 2.12 (2015): 611-615. (Year: 2015).*

Furukawa, Tomonari, Benjamin Lavis, and Hugh F. Durrant-Whyte. "Parallel grid-based recursive Bayesian estimation using GPU for real-time autonomous navigation." 2010 IEEE International Conference on Robotics and Automation. IEEE, 2010. (Year: 2010).*

He, Shengfeng, et al. "Supercnn: A superpixelwise convolutional neural network for salient object detection." International journal of computer vision 115.3 (2015): 330-344. (Year: 2015).*

O'Shea, Keiron, and Ryan Nash. "An introduction to convolutional neural networks." arXiv preprint arXiv:1511.08458 (2015). (Year: 2015).*

Taylor, Graham W., et al. "Convolutional learning of spatio-temporal features." European conference on computer vision. Springer, Berlin, Heidelberg, 2010. (Year: 2010).*

Brochu, Eric, Vlad M. Cora, and Nando De Freitas. "A tutorial on Bayesian optimization of expensive cost functions, with application to active user modeling and hierarchical reinforcement learning." arXiv preprint arXiv:1012.2599 (2010). (Year: 2010).*

Papadimitriou, Spiros, and Philip Yu. "Optimal multi-scale patterns in time series streams." Proceedings of the 2006 ACM SIGMOD international conference on Management of data. 2006. (Year: 2006).*

Peng, Huan-Kai, Understanding and Engineering Social Dynamics, PhD Thesis; catalogued in Carnegie Mellon University repository Jan. 31, 2016.

* cited by examiner

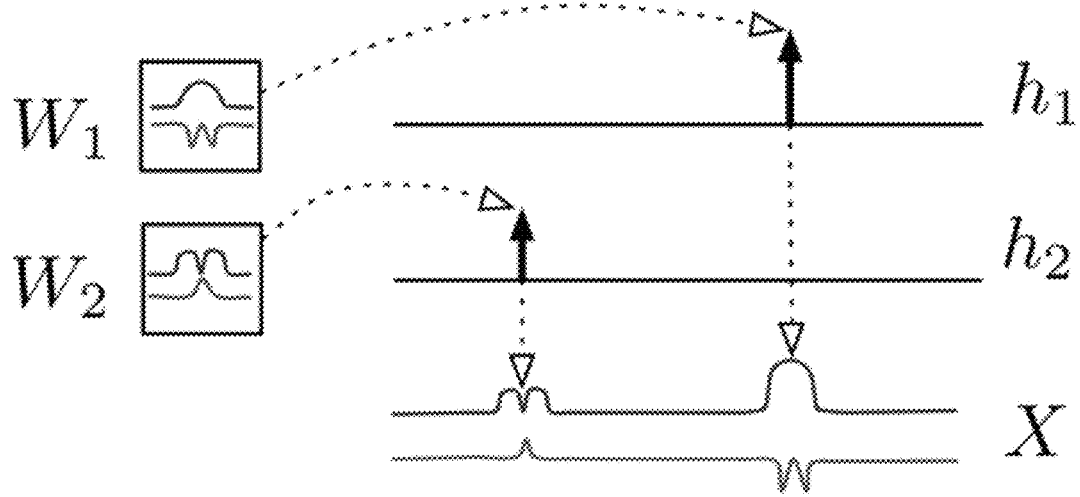

FIG. 3

| | Base Model | |
|---|---|---|
| $X$ | | social-dynamic matrix, $X \in R^{D \times T}$ |
| $W_k$ | | the $k$-th filter matrix, $W_k \in R^{D \times T_w}$ |
| $h_k$ | | the $k$-th activation vector, $h_k \in R_+^{T-T_w+1}$ |
| $\sigma, \beta$ | | parameters of $P(X|h)$ and $P(h)$, respectively |
| $K$ | | the number of filters (in one level) |
| $T_w$ | | filter scale |
| | Model Learning | |
| $\{X^{(i)}\}_{i=1}^n$ | | set of $n$ sample social dynamics |
| $n$ | | size of sample social dynamics |
| $h_k^{(i)}$ | | the $k$-th activation vector of the $i$-th sample |
| $t_h, t_W$ | | step-sizes for updating $h_k$ and $W_k$, respectively |
| $h_k^r$ | | the solution of $h_k$ in the $r$-th optimization iteration |
| $W_k^r$ | | the solution of $W_k$ in the $r$-th optimization iteration |
| | Stacking Multiple Layers | |
| $X_l$ | | input dynamic at level $l$ |
| $h_{l,k}$ | | the $k$-th activation vector at level $l$ |
| $W_{l,k}$ | | the $k$-th filter matrix at level $l$ |
| $K_l$ | | the number of filters at level $l$ |
| $c$ | | the factor used for downsampling |
| $L$ | | the number of levels of an RCBM | doi:10.1371/journal.pone.0118309.t001

FIG. 4

Major Disaster

RT @BreakingNews: BULLETIN—TSUNAMI WARNING ISSUED FOR AMERICAN SAMOA, SAMOA, NIEU, WALLIS-FUTUNA RT @BreakingNews Tsunami watch iss. for Indonesia, India, Thailand & Malaysia after a powerful 7.9-magnitude earthquake off Sumatra RT @marcambinder: Breaking: Small plane and helicopter collide over Hudson River in Manhattan, 10-60 (major emergency) declared.

Urgent message

RT @SFChron_alert: Obama declares swine flu a national emergency. http://www.sfgate.com/ZILO RT from Iran—If you are outside Iran, change your location / timezone to Iran / Tehran to make it harder to track Iranians

SaveBalloonBoy Colorado Boy Floats Away In Balloon, Frantic Search Under Way To Rescue Boy http://bit.ly/texWi

Major online service shutdown

And the world has come to an end... Gmail is down.

i hate @youtube for wrongfully banninag @ownagepranks account #youtubefail

Machine-generated message omg!! is it true what they wrote about you in their twit blog? http://ilia.twittersblogs.com EVERYONE!!! Check this new dating site out! Totally Free! talk to mad local chicks that are down for anything! http://local-samz.com 300 new followers in a day—TOTALLY FREE—NO SALE—http://twittertrain.info Hey everyone. Just lost 32 lbs in 3 weeks. I wanted to say thanks to Rhonda and her awesome blog. www.rhondasweightloss.com Hey #JonasOnUstream I LOVE IT (Jonas Brothers live > http://ustre.am/2us4)

CHECK out this site, im a member of it, it gets you more followers. http://TwitTrain.info Hello!, I just made $842 working a few hours this week from home for Google. You should really check this out! http://bit.ly/u7Rvz I made an extra $80 today from using tips from http://EARNING-PROFIT3.com I just took "how sexual are you?" and got: virgin! Try it? http://bit.ly/zM3kl doi:10.1371/journal.pone.0118309.t002

FIG. 18

Adult Entertainment
First time visiting a male-dancing strip club. Never in my wildest dreams did I think I would enjoy this experience as much as I did! (5)
I got accosted and molested by this tall blond Eastern European girl who tried dragging me back to VIP. (1)
I am a strip club aficionado, and this place cannot be beat. (5)
Do you like being crammed into tight spaces and being yelled at by security wherever you stand? (1)
We call it heaven. Real life angels wiggling for our pleasure! (5)
My wife and I dropped $560 here tonight and got almost nothing out of it. (1)
Poor Service / Facility
Terrible customer service, hold times are outrageous, issues are rarely fixed in a timely manner. (1)
No stars, but its forcing me to at least do one star to do this review, worst customer service ever!!! (1)
The store, the people who go there, the parking lot, the area, it is just all gross. (1)
It's dirty in there, and none of the employees are happy that they have a job. (1)
This mall is sad. You will actually feel bad for this mall. (1)
My son gripped my hand as if we were walking through a haunted house. My wife did the same. (1)
Consistently Outstanding Restaurants
The restaurant exceeded our expectation in both food and service. (5)
It is pricey, but the food and service is always consistently excellent. (5)
Loved everything about this place and was surprised it lived up to the hype. (5)
This place was incredible, and totally lived up to the hype. (5)
Thin Crust Pizza at its best. (5)
From start to finish, from wine to dessert and everything in between, this place lived up to all of my expectations and then some. (5)

doi:10.1371/journal.pone.0118309.t003

FIG. 19

Holiday
Merry Christmas! Anyone staying up to wait for Santa?
Happy Thanksgiving to all my friends in the US
Common emotion
VMAs Taylor Swift is amazing. Kanye is so rude. @taylorswift13, you go girl. I'm proud of you:)
RT @newellhj Oh Nick. You are an idiot. This is why you should have been invited. You just show you're an idiot. #bbcqt
Trendy events
Yankees win! Thaaaaaaaaa Yankees win! #WorldSeries #Champs
Hooray! North Korea pardoned the detained US journalists!
So the balloon landed and the little boy isn't inside?! Where is he?? Ahh!
I wonder if Obama actually wrote this speech because it's really good.
Hi, I'm Madonna. I'm doing a tribute to Michael Jackson in which i ramble about myself the whole time because i am so very classy.
Watching the emmy's
Is it wrong that I cried at the glee finale? I wish it was like when I was in high school.

doi:10.1371/journal.pone.0118309.t004

FIG. 20

| Method | RMSE |
|---|---|
| VARMA + Baseline | 451.1 |
| VARMA + H1 | 246.7 |
| VARMA + H2 | 397.6 |
| VARMA + H1$^2$ | 313.8 |
| VARMA + H1 + H2 | 235.9 |
| SVR + Baseline | 397.6 |
| SVR + H1 | 231.0 |
| SVR + H2 | 360.4 |
| SVR + H1$^2$ | 261.5 |
| SVR + H1 + H2 | 184.2 | doi:10.1371/journal.pone.0118309.t005

FIG. 21

| Method | RMSE |
|---|---|
| VARMA + Baseline | 892.2 |
| VARMA + H1 | 647.9 |
| VARMA + H2 | 674.1 |
| VARMA + H1² | 655.6 |
| VARMA + H1 + H2 | 639.8 |
| SVR + Baseline | 744.5 |
| SVR + H1 | 584.3 |
| SVR + H2 | 582.7 |
| SVR + H1² | 598.1 |
| SVR + H1 + H2 | 536.0 | doi:10.1371/journal.pone.0118309.t006

|  | Variables |
|---|---|
| $X$ | observation dynamics; $X \in R^{D \times T_x}$. |
| $U$ | intervention dynamics; $U \in R^{D \times T_u}$. |
| $V$ | outcome dynamics; $V \in R^{D \times T_v}$. |
| $Y$ | $Y = [UV] \in R^{D \times T_y}$. |
| $W_{ik}$ | the $k$-th filter matrix in the $i$-th layer; $W_k \in R^{D \times T_w}$. |
| $h_{ik}$ | the $k$-th activation vector in the $i$-th layer; $h_{ik} \in R^{T_x T_w+1}$. |
| $D$ | the dynamics dimensionality. |
| $T_x, T_w$, etc. | the temporal length of $X$ or $W$, etc. |
| $\alpha_i, \beta_i$ | parameters of $P(X|h)$ and $P(h)$, respectively. |
| $K_i$ | the number of filters in $i$-th level. |
| $x, y$, etc. | vectorization of $X$ or $Y$, etc. (Eq 1). |
| $h_i$ | vector concatenation of $\{h_{ik}\}_{k=1}^{K_i}$. |
| $m_x, m_y$, etc. | length of $x$ or $y$, etc. |
| $B, d$ | parameters of the score function (Eq 2). |
| $C_{cost}, C_{reward}$ | cost / reward parameters (Eqs 3 and 4). |
| $V_{ref}$ | pattern to be matched (Eq 3). |
| $\rho$ | tradeoff parameter (Eqs 3 and 4). |
| $c$ | max-pooling parameter. |
| $S, s$ | max-pooling dummy variables; $s = \text{vec}(S)$. |
| $Q, p, A$ | canonical variables of Quadratic Programming |
| Special matrices and operations | |
| $I_n$ | $n$-by-$n$ identity matrix |
| $1_{m \times n}$ | $n$-by-$m$ matrix with 1 in its elements. |
| $0_{m \times n}$ | $n$-by-$m$ matrix with 0 in its elements. |
|  | Subscripts might be omitted for simplicity. |
| $\circledast$ | Specialized convolution in Eq 7 |
| $\otimes$ | Kronecker product |
| $\text{vec}(\cdot)$ | vectorization of a matrix | doi:10.1371/journal.pone.0146490.t001

FIG. 24

PATTERN IDENTIFICATION IN TIME-SERIES SOCIAL MEDIA DATA, AND OUTPUT-DYNAMICS ENGINEERING FOR A DYNAMIC SYSTEM HAVING ONE OR MORE MULTI-SCALE TIME-SERIES DATA SETS

RELATED APPLICATION DATA

This application claims the benefit of priority of U.S. Provisional Patent Application Ser. No. 62/388,074, filed Jan. 15, 2016, and titled "PATTERN IDENTIFICATION AND DATA-DRIVEN ENGINEERING OF SOCIAL DYNAMICS," which is incorporated by reference herein in its entirety.

GOVERNMENT RIGHTS CLAUSE

This invention was made with government support under CCF1314876 awarded by National Science Foundation. The government has certain rights in the invention.

FIELD OF THE INVENTION

The present invention generally relates to the field of computer-implemented time-series data analysis and data-driven engineering. In particular, the present invention is directed to pattern identification in time-series social media data, and output-dynamics engineering for a dynamic system having one or more multi-scale time-series data sets.

BACKGROUND

All activities in social networks evolve over time. Consequently, understanding the structures behind social dynamics represents a central question in social networks research, with many important applications including political campaigning, viral marketing, and disaster response. Many researchers have studied temporal patterns of social activities. These studies often cover various types of social dynamics, including the numbers of propagators and commentators, the breadth and depth of the propagation tree, the persistence of hashtags, and general graph statistics (e.g., the graph diameter).

Another line of research targets the systematic pattern discovery of social dynamics. Much of this work conducts pattern mining using distance-based clustering. For example, one group of researchers uses spectral clustering for one-dimensional dynamics. Also, an efficient mean-shift clustering algorithm has been proposed for multi-dimensional social dynamics. Other researchers use model-based methods to identify dynamics patterns. For example, another group of researchers uses a Gaussian Mixture model to analyze the proportions of readership before, at, and after the peak. Yet another group of researchers has proposed a deep-learning method that is capable of mining patterns of multiple time scales.

Many previous works are devoted to the modeling of social dynamics. Some of them are generative in nature and define a probability distribution of social dynamics. There are also predictive models, where a probability distribution can be indirectly defined, e.g., by introducing Gaussian noise.

Despite the large amount of research in the field of social dynamics, it remains desirable to improve the ability to identify structures behind social dynamics, both in terms of solution quality and computational efficiency. It also appears that no one has yet developed a rigorous methodology for engineering the outcome dynamics of a social system. A reason for this is that it is generally difficult to use a predictive model alone to solve engineering tasks; this is because, by definition, intervention is not considered in dynamics prediction, but is required in dynamics engineering.

SUMMARY OF THE DISCLOSURE

In one implementation, the present disclosure is directed to a computer-implemented method of determining patterns with a time-series social-media data set. The computer-implemented method includes receiving, by a social-media-data pattern-identification system, the time-series social-media data set; applying, by a social-media-data pattern-identification system, a deep-learning algorithm to the time-series social-media data set, wherein the deep-learning algorithm is designed and configured to analyze the time-series social-media data set for patterns across multiple time scales and to output pattern-identification data containing information on patterns in a plurality of the multiple time scales and across a plurality of the multiple time scales; and providing the output pattern-identification data to an output-interface of the social-media-data pattern-identification system.

In another implementation, the present disclosure is directed to a computer-implemented method of engineering outcome dynamics of a dynamic system that includes one or more multi-scale time-series data sets. The computer-implemented method includes training a generative model using each of the one or more multi-scale time-series data sets; providing an optimization problem composed of a likelihood function of the generative model and a score function that reflects a utility of the dynamic system; solving the optimization problem so as to determine an influence indicator indicating an influence scheme for influencing the outcome dynamics; and providing the influence indicator to an outcome-dynamics influencing system.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is a diagram illustrating an exemplary generation process of a convolutional Bayesian model (CBM);

FIG. 4 is a table of variables used throughout the pattern identification section and corresponding appended claims;

FIG. 18 is a table of sample TWITTER® keywords and tweets that are associated with abnormal social dynamics detected using RCBM;

FIG. 19 is a table of sample YELP® business reviews that are associated with abnormal social dynamics detected using RCBM;

FIG. 20 is a table of sample TWITTER® popular keywords and tweets associated with normal social dynamics;

FIG. 21 is a table of forecasting error (via RMSE) of various models and features using the TWITTER® dataset;

FIG. 24 is a table of variables, special matrices, and operators used throughout the disclosure and appended claims;

DETAILED DESCRIPTION

Figure 1:
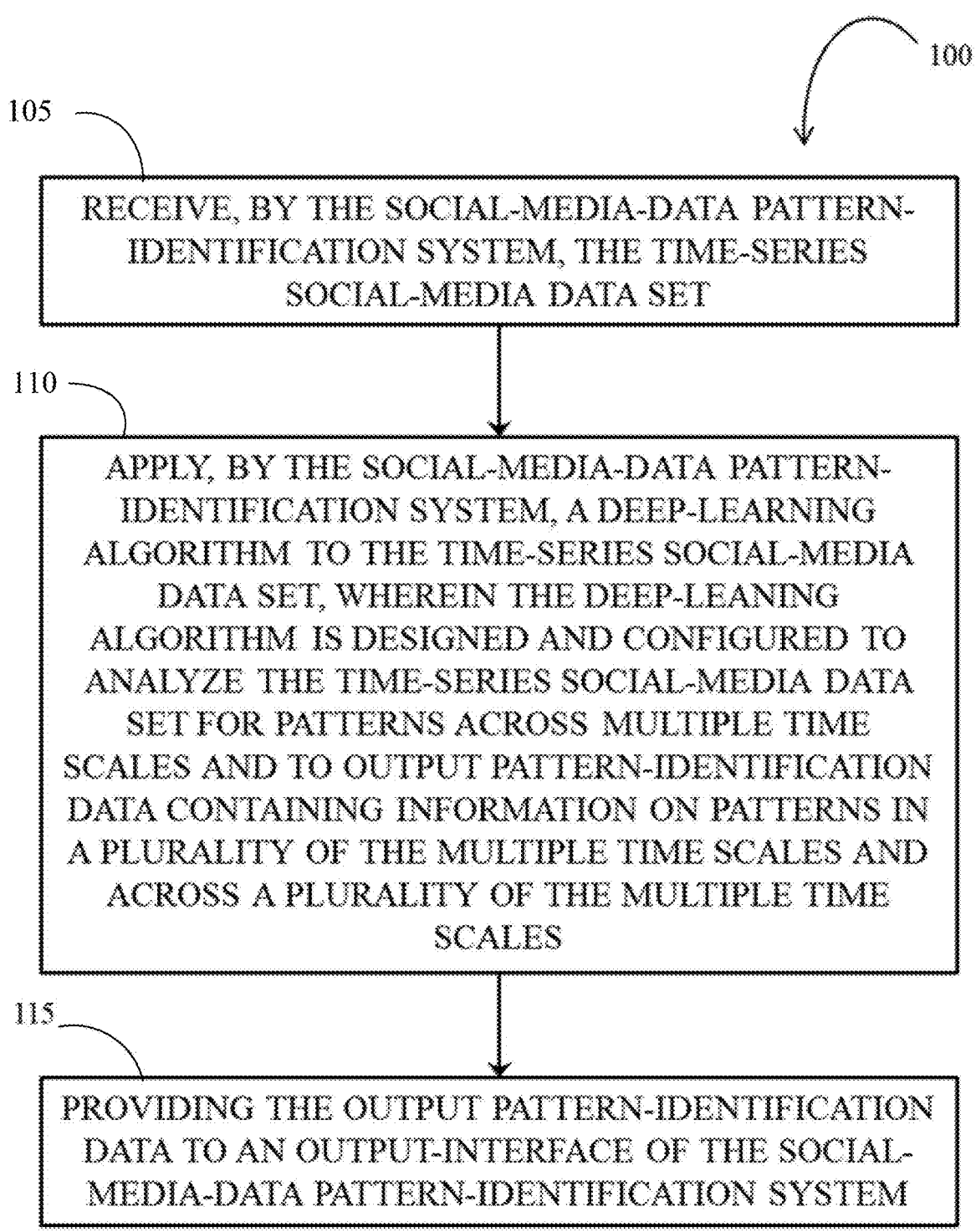
FIG. 1 is a flow diagram of an exemplary method of identifying patterns within social media data at multiple time scales.

In some aspects, the present invention is directed to computer-implemented methods of identifying compositional structures, or patterns, that underlie social dynamics present in D-dimensional time-series social media data from online social media. In this context, the term "online social media" may be construed broadly to mean any online forum to which users can provide content (e.g., post comments, post memes, post emojis, select selectors (such as a thumb's-up or thumb's-down selector), post images, post videos, etc., and any combination thereof). Examples of such online social media include, but are not limited to, social network platforms (e.g., the TWITTER®, SNAPCHAT®, FACEBOOK®, INSTAGRAM®, etc., social media platforms and review/comment platforms (e.g., apps such as YELP, FOURSQUARE, ZAGAT, OPENTABLE, etc., and review/comment sections of virtually any sort of online source, such as news sites, video sites (e.g., YOUTUBE, VIMEO, VID.ME, etc.), online shopping sites, blog sites, etc.), among others. Fundamentally, there is no limitation on the online source(s) of the D-dimensional time-series data.

Social media exhibits rich yet distinct temporal dynamics that cover a wide range of different scales; in other words, social-media data exhibits multi-scale compositionality. In order to study these complex dynamics, two fundamental questions revolve around (1) the signatures of social dynamics at different time scales, and (2) the way in which these signatures interact and form higher-level meanings. At a high level and as described in greater detail below, features of such methods involve constructing and applying a deep-learning framework to time-series social dynamics data. In some embodiments, the deep-learning framework uses specialized convolution operators that are designed to exploit the inherent heterogeneity of social dynamics.

In other aspects, the present invention is directed to computer-implemented methods of influencing, or engineering, outcome dynamics of a dynamic system having one or more multi-scale time-series data streams. In the context of the present disclosure, engineering outcome dynamics involves determining an intervention using a generative model learned from the one or more multi-scale time-series data streams and applying that intervention to the dynamic system so as to influence, or engineer, one or more aspects of the output dynamics of the dynamic system. As a brief example, consider the problem of how a company can best use the TWITTER® social-media platform to implement a marketing campaign for a new product. Here, the company has a range of options for the campaign, such as the number of "tweeters" to use, the frequency of "tweeting," the content of the tweets, whether or not to use "retweeters," the duration of the tweeting campaign etc., as well as a budget for the campaign. The question becomes: what is a combination of campaign options (intervention dynamics) to be applied to the TWITTER® social-media platform (dynamic system) that provides the optimal value (outcome dynamics) for the marketing campaign budget? Many other applications of outcome-dynamics engineering would be useful, and several are addressed below.

Pattern Identification

As mentioned above, some aspects of the present invention are directed to methods of identifying patterns in social-media data at differing time scales and across differing time scales, for example, to extract broader meanings from the patterns. Pattern identification and other types of analysis of social medial data is an increasingly important technology as social media platforms increasingly become primary platforms for social interactions ranging from commentary and discourse to marketing to politics and to many other types of social interactions. For example, pattern identification technologies can be applied to a wide variety of tasks including, but not limited to, monitoring, tracking, analysis, prediction, marketing, political promotion, and dynamics engineering, among others. Those skilled in the art will readily understand the importance of pattern-identification technology in the social media realm and will greatly appreciate the improvements a multi-scale pattern-identification methodology of the present disclosure brings to this technology. In view of its importance, dynamics engineering is addressed in great detail below.

Referring now to the drawings, FIG. 1 illustrates an exemplary computer-implemented method 100 that can be used to determine patterns within a time-series social-media data set. Examples of social media data sets that can be used as the time-series social-media data set operated on by method include, but are not limited to, time-series data sets from, for example, the TWITTER®, SNAPCHAT®, FACEBOOK®, INSTAGRAM®, YELP®, etc., social media platforms, among many others, including blogs, online review and commentary of online posts (e.g., news posts, video posts, article posts, etc.), and online product reviews, among many others.

Figure 2:
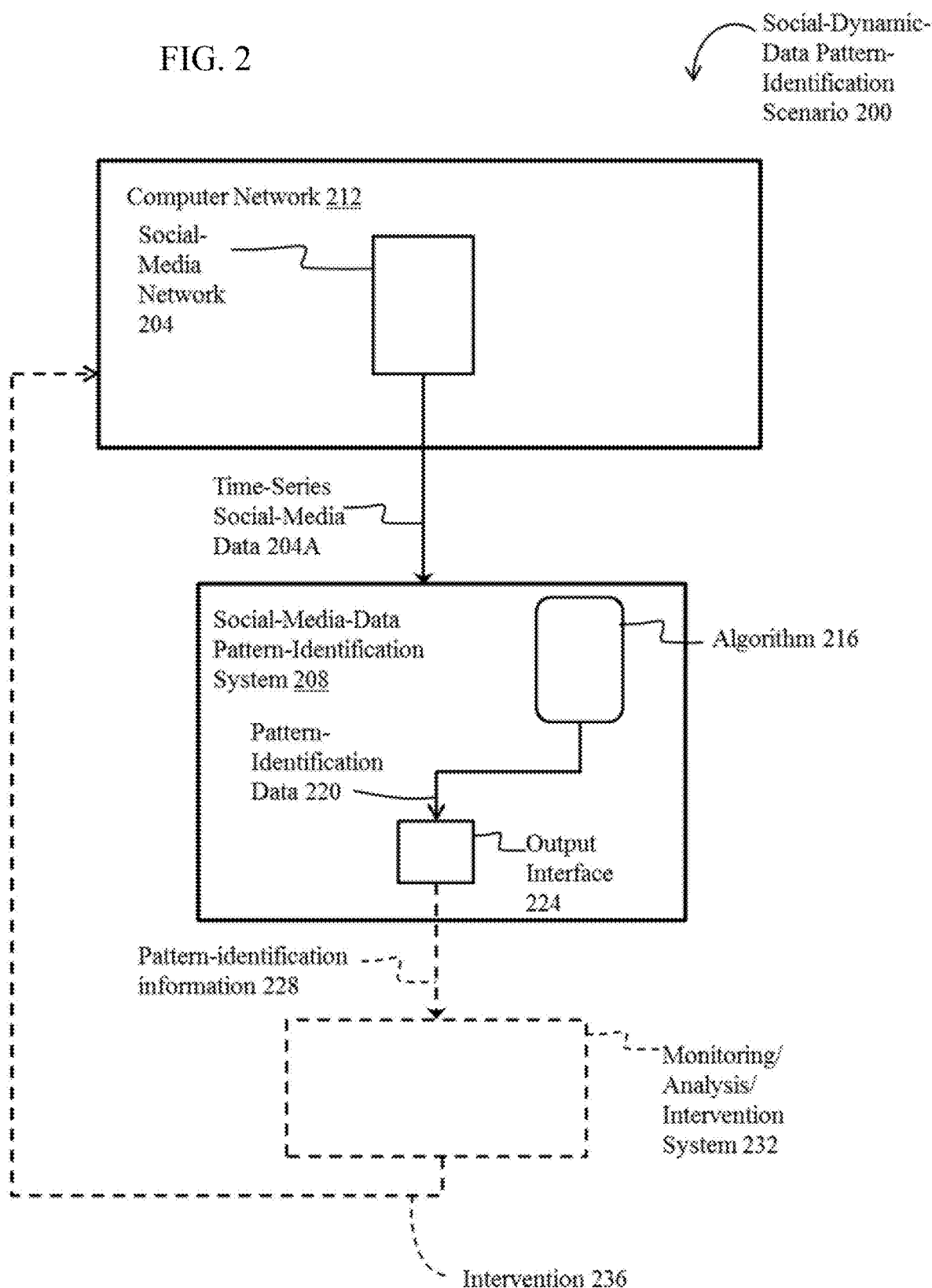
FIG. 2 is a high-level diagram illustrating a pattern identification system executing the method of FIG. 1.

To aid in reader understanding of method 100 of FIG. 1, FIG. 2 illustrates an exemplary social-dynamic-data pattern-identification scenario 200 that includes a social-media network 204 and a social-media-data pattern-identification system 208. In this example, social-media network 204 is present on a computer network 212, such as the Internet, among others. Social-media-data pattern-identification system 208 includes an algorithm 216 that performs at least method 100 of FIG. 1. In this connection and referring to FIG. 1, at step 105 social-media-data pattern-identification system 208 receives a time-series social-media data set 204A, which may be any suitable time-series data set from social-media network 204. Examples presented below utilize particular time-series data sets from the TWITTER® and YELP® social media platforms.

At step 110, social-media-data pattern-identification system 208 applies, here, via algorithm 216, a deep-learning algorithm to time-series social-media data set 204A. The deep-learning algorithm is designed and configured to analyze data in time-series social-media data set 204A for patterns across multiple time scales and to output, at step 115, pattern identification data containing information on patterns in a plurality of the multiple time scales and across a plurality of the multiple time scales. In one example, which is described in detail below, algorithm 216 performs a recursive convolutional Bayesian model (RCBM) for such pattern detection. The RCBM disclosed herein can be particularly useful because of it special convolutional operator, which is described in detail below, that tailors the gradient used in the learning process of the RCBM to the type of data at issue, i.e., time-series social-media data 204A.

In a particular example of an RCBM algorithm described below, a step may be to let the current temporal resolution be the finest that is relevant for the particular application at issue (e.g., seconds). Under the current temporal resolution, the RCBM algorithm iteratively learns the relevant patterns (and the time and strength they are activated) using updating rules, such as the updating rules in Algorithms 1 and 2 presented below. The temporal resolution may then be increased by max-pooling (i.e., taking the maximal value over consecutive values) activation strength vectors. Then, the RCBM algorithm may proceed to back to the iterative learning if the new resolution is still relevant to the application. Otherwise, the algorithm may terminate and output pattern-identification data 220 that includes the patterns identified in all relevant temporal resolutions. Further details of this example are presented below in the next section.

A deep-learning algorithm, such as the RCBM explicitly disclosed herein, of social-media-data pattern-identification system 208 can be used, for example, to improve anomaly detection and dynamics forecasting in online social media. For example and in the context of the RCBM disclosed herein, the patterns learned by the RCBM can be plugged into Equation 12 (see below) to measure the degree of anomaly of the social dynamics. The RCBM method can successfully detect abnormal behaviors in multiple temporal resolutions, such as urgent messages and service shutdown on the TWITTER® platform and adult entertainment and consistently-outstanding restaurants on the YELP® platform. These features cannot be detected by conventional methods, for example, that are based on term-frequencies. These examples are detailed in the tables of FIGS. 18-20, discussed below. For dynamics forecasting, by using the proposed method as the feature-extraction engine, we can reduce the forecasting error significantly for both the TWITTER® and YELP® platforms. These examples are detailed below in the tables of FIGS. 21 and 22, discussed below. As those skilled in the art will readily appreciate, these examples are merely illustrative of the many applications of deep-learning to time-series social-media data.

In some embodiments, pattern-identification data 220 may be output to an output interface 224 of social-media-data pattern-identification system 208. In turn, output interface 224 may output pattern-identification information 228 to a monitoring/analysis/intervention system 232 that may perform any one or more of monitoring, analysis, and intervention functions, among other functions. Output interface 232 may have any suitable configuration and function, such as an application programming interface that essentially only passes-through pattern-identification data 220 as pattern-identification information 228 or as a more sophisticated interface that receives the pattern-identification data a raw data and operates on the data, such as to create graphs and other higher-level information as the pattern-identification information. In this connection, monitoring/analysis/intervention system 232 may take any of a wide variety of forms, such as one or more display devices (e.g., video monitors), one or more display devices in combination with one or more human personnel charged with monitoring and/or analyzing pattern-identification information 228, and/or an outcome-dynamics-engineering system (e.g., outcome-dynamics-engineering system 2608 of FIG. 26). In the case of monitoring/analysis/intervention system 232 including an outcome-dynamics-engineering system, such system may work in conjunction with an outcome-dynamics-influencing system (e.g., outcome-dynamics-influencing system 2612 of FIG. 26) that provides an intervention 236 (e.g., corresponding to intervention 2648 of FIG. 26) to, for example, social-media network 204. Further details regarding outcome-dynamics-engineering systems and outcome-dynamics-influencing systems are described below.

Exemplary Deep-Learning Model

Introduction. All activities in social networks evolve over time. Consequently, understanding the structures behind social dynamics represents a central question in social networks research, with many important applications including, for example, political campaigning, viral marketing, and disaster response. While several recent works have investigated methods to identify patterns of social dynamics, this disclosure addresses a new, unexplored perspective of social dynamics, namely, multi-scale compositionality.

Studying multi-scale compositionality consists of identifying compositional structures of social media dynamics, which generally covers two tasks:

T1. Identifying multi-scale signatures, which comprises identifying distinct signatures across a range of time scales, as opposed to sticking with a single one; and T2. Mining of compositional interactions, which requires discovering the interaction among multiple such signatures that produce higher-level meanings.

To illustrate these tasks, consider the case of human face recognition, wherein the first task includes recognizing the eyebrows, the cheeks, or the overall head shape. In contrast, the second task includes gauging the distance between the eyebrows, measuring the angle between the jaw and the ears, or recognizing the polygon formed by the lips, cheeks, and eyebrows. To recognize a human face, both tasks are equally important: one could make a mistake by either recognizing the wrong shape of an eyebrow, or by over/underestimating the distance between the eyebrows.

In the context of social dynamics, the same two tasks are found to be equally relevant. Indeed, social media exhibit distinct signatures at various time scales that range, for example, from seconds to days, whereas different combinations of such signatures can have totally different meanings and consequences. For example, an intense popularity of some keywords followed by a vibrant discussion may indicate a trendy event; however, the same popularity without any follow-up discussion can, on the contrary, indicate an internet scam. Clearly, being able to distinguish between the two cases can make a big difference.

This disclosure introduces a new model, namely, the RCBM, which is capable of addressing both tasks. An idea of RCBM is building a layered structure of signature detectors, wherein each layer is responsible for a specific time scale. Moreover, a higher-level layer is capable of detecting the interactions of various signatures (as they come from its immediate lower layer), and hence can identify compositional structures.

To the best of the present inventors' knowledge, this work brings at least the following new contributions:

1. Design and Analysis of RCBM: RCBM is a new deep-learning framework based on specialized convolution operators. While the formulation of RCBM is general enough to consider the heterogeneity of social signals, its runtime performance and solution quality are analyzed formally and confirmed experimentally. Of note, this is the first time when deep learning is used in the context of social dynamics.

2. Identifying Compositional Structures of Social Dynamics: In one exemplary experiment using RCBM, it is discovered that the social dynamics in a TWITTER® dataset are characterized by signatures representing the dynamics' popularity, contagiousness, stickiness, and interactivity. In another exemplary experiment using RCBM, the social dynamics in YELP® datasets are characterized by signatures representing how different groups of reviewers rate individual businesses. Further, the patterns where these signatures interact by generating, enhancing, or dominating one another can be found.

3. RCBM-Enabled Applications: New applications enabled by RCBM are exemplified, including the detection of abnormal social dynamics and the forecasting of social dynamics with features extracted using RCBM.

Problem Definition. A generic "information token" (e.g., a YOUTUBE® video, photo, hashtag, etc.) is used as the proxy for social dynamics. Since the social dynamics that emerge while an information token is being propagated across a social network can be characterized by multiple statistics (e.g., the ones mentioned above), $X \in R^{D \times T}$ is used to represent the D-dimensional social dynamics corresponding to an information token (e.g., D=2 for the X in FIG. 3). The precise definition of X depends on the dataset and the application. See the examples below for the cases of using TWITTER® and YELP® datasets. All notations in this section concerning pattern identification are summarized in the table of FIG. 4. Given a set of social dynamics $\{X_{(i)}\}_{(n)i=1}$ (associated with n information tokens), the problem may be defined as finding a set of D-dimensional "structures" (e.g., the filter matrices $W_1$ and $W_2$ in FIG. 3) that best characterize these dynamics. The following three assumptions are made for solving this problem:

A1. Finite Structures: the social dynamics can be characterized by a finite number of structures that are invariant to shifting in time and scaling in magnitude.

A2. Burstiness: the distribution for the magnitude of the social dynamics is right-skewed; it is typically small but can be occasionally very large.

A3. Heterogeneity: for each D-dimensional structure, all dimensions have different meanings and no one is an exact copy of another.

Model. In this embodiment, a convolutional Bayesian model (CBM) is used as the basis for the deep learning model. For the model, each social dynamic X is postulated as being generated by random activations of filters. For illustration, consider FIG. 3 where $W_1$ and $W_2$ represent two filter matrices, while $h_1$ and $h_2$ represent their activation vectors, respectively. From FIG. 3, the social dynamic X is generated by making copies of the filter matrices $W_1$ and $W_2$. Moreover, the activation vectors determine the time-shift and the magnitude of these two copies: $h_2$ is active earlier but weaker, hence the first weaker signal in X; $h_1$ is active later but stronger, hence the latter stronger signal.

Formally, given a set of K filters $\{W_k\}_{k=1}^K$, our generation process for a social dynamic X is:

1. Sample $\{h_k\}_{k=1}^K$ such that $h^k[t] \sim \text{Exp}(\beta) \forall k, t$ 2. $X = \Sigma_k W_k \otimes h_k + \epsilon$ where $\epsilon \sim N(0, \sigma^2)$. (1)

wherein $\text{Exp}(\cdot)$ and $N(\cdot)$ denote the Normal and Exponential distributions, respectively, with parameters $\beta$ and $\sigma$. Also, $\otimes$ denotes a specialized convolutional operator that carries out the "scale-and-copy" task illustrated in FIG. 3. It is defined as:

$$(W \otimes h)[d, t] = \sum_{s=1}^{T_w} h[t + T_w - s] \cdot W[d, s] \ \forall \ d, t. \quad (2)$$

Effectively, ⊛ does D 1-D convolutions between each row of W and the entire h, and puts the results back to each row of the output matrix separately. Moreover, the above generation process implies a joint distribution P(X,h)=P(X|h)P(h) where:

$$P(X \mid h; W, \sigma) = \frac{\sqrt{2}}{\sigma\sqrt{\pi}} \exp\left(\frac{\left\|X - \sum_k W_k \otimes h_k\right\|_F^2}{-2\sigma^2}\right) \quad (3)$$

$$P(h; \beta) = \frac{1}{\beta} \exp\left(\frac{\sum_k \|h_k\|_1}{-\beta}\right).$$

CBM Features. The design of CBM closely reflects assumptions A1 to A3, noted above. To address assumption A1, a convolutional formulation is used such that the structures (i.e., the filters W's) are invariant to shifting in time and scaling in magnitude. To address assumption A2, burstiness is enforced by assuming that the magnitude of the activation vectors (i.e., h's) follows an exponential distribution, which is typically small but occasionally large. This will also enforce sparsity for activation vectors during model learning (see below). To address assumption A3, heterogeneity is considered using the specialized convolutional operator ⊛ noted above instead of the conventional matrix convolution. This provides provable advantages in both runtime and solution quality.

CMB Model Learning. Since given W and h, the Maximum Likelihood Estimators (MLE) for σ and β (in Equation 3) can be calculated in closed form, the main challenge for learning a CBM lies in estimating W in presence of the hidden variables $h_k$'s. Formally, the problem can be written as:

$$W^* = \arg\max_W \log P(X) = \arg\max_W \log \int P(X \mid h) P(h) dh. \quad (4)$$

Assuming that P(W,h) peaks with respect to h, we obtain the approximation:

$$W^* \approx \arg\max_W \max_h \log P(X \mid h) P(h) \quad (5)$$

$$= \arg\max_{W,h} \frac{-1}{2}\left\|X - \sum_k W_k \otimes h_k\right\|_F^2 - \frac{\sigma^2}{\beta}\sum_k \|h_k\|_1,$$

where $\|\cdot\|_F$ denotes the Frobenius norm. Now, considering a set of n samples of social dynamics $\{X_{(i)}\}_{ni=1}$ and their corresponding activation vectors $\{\{h_{(i)k}\}_{Kk=1}\}_{ni=1}$, Equation 5 becomes:

$$\arg\min_{W,h} \sum_i \left(\frac{1}{2}\left\|X^{(i)} - \sum_k W_k \otimes h_k^{(i)}\right\|_F^2 + \frac{\sigma^2}{\beta}\sum_k \|h_k^{(i)}\|_1\right) \quad (6)$$

s.t. $\|W_k\|_F \leq 1 \forall k$ $h_k^{(i)} \geq 0 \forall k, i.$

In Equation 6, two additional constraints are incorporated to improve the solution quality of W. Specifically, the first constraint prevents $W_k$ from blowing up, because otherwise the objective function can be trivially improved by scaling up (and down) $W_k$ (and $h_k$) by the same factor. Also, the second constraint helps ensure that the signs of $W_k$ are not arbitrary and hence can be interpreted coherently. It is noted that Equation 6 is similar to sparse coding, with two important distinctions. First, the conventional matrix multiplication is used in sparse coding, whereas a convolutional formulation is used in Equation 6. Second, in sparse coding, the penalty strength (usually denoted as λ) needs to be tuned manually, whereas in Equation 6, the value of $$\frac{\sigma^2}{\beta}$$

can be assigned using MLE with a straightforward meaning.

To solve Equation 6, since the problem is convex with respect to each one of W and h (but not both), solving alternates between optimizing over one of them while keeping the other one fixed. To start with, the derivatives of the smooth part of the objective function (i.e., $f_1(W, h) = \frac{1}{2}\|X^i - \Sigma_k W_k \otimes h_k(i)\|_F^2$) are first derived with respect to h and W:

$$\nabla f_1(h_k^{(i)}) = \tilde{W}_k \odot (\Sigma_j h_j^{(i)} \otimes W_j - X)$$

$$\nabla f_1(W_k) = \Sigma_i \tilde{h}_k^{(i)} \odot (\Sigma_j h_j^{(i)} \otimes W_j - X). \quad (7)$$

Here, the deconvolution operator ⊙ is defined as:

$$(W \otimes X)[t] = \sum_{d=1}^{D} \sum_{s=1}^{T_w} X[d, t - s + 1] \cdot W[d, s]. \quad (8)$$

Again, the ⊙ operator differs from the conventional matrix convolution. Effectively, it calculates the 1-D convolutions of individual rows of W and X separately, and then adds them together to form a single row. This brings the same advantages as the ⊛ operator does, as mentioned above.

Stepsize Assignment. Typically, one can use line search to determine the stepsize in gradient-based methods. In the present case, however, doing so would slow down the optimization considerably because the line search itself needs many additional convolutions. Therefore, the following stepsize assignments for h and W, respectively, are derived:

$$t_{h_k} = \frac{\alpha}{\|W_k\|_1^2} \quad (9)$$

$$t_{W_k} = \frac{\alpha}{\sum_i \|h_k^{(i)}\|_1^2},$$

wherein α∈(0,2). These stepsize assignments are essential to ensure good runtime and convergence properties.

Overall Algorithm. Algorithm 1, below, provides the pseudocode for CBM learning. Algorithm 1 takes as inputs a set of n sample social dynamics $\{X^{(i)}\}_{i=1}^n$, the scale of the filters $T_w$, and the number of filters K, and produces as outputs all model parameters including $\{W_k^{[r]}\}_{k=1}^K$, σ, and β. In each iteration of the main repeat loop of Algorithm 1, three tasks are executed in turn: Task 1 (the first for-loop) consists of solving Equation 6 with respect to h; Task 2 (the second loop) consists of advancing one step toward the solution of Equation 6 with respect to W; Task 3 (the reminder two lines) consists of calculating the MLE for σ and β. The details of Task 1 are presented in Algorithm 2, below. This is basically designed based on the Nestrov acceleration and the proximal method, where the function $S_{+\lambda}(\cdot)$ is an element-wise function defined as:

$$S_\lambda^+(u) = \begin{cases} u - \lambda & \text{if } u > \lambda \\ 0, & \text{otherwise} \end{cases}.$$

Task 2 is conceptually similar to Task 1, where $\Pi(\cdot)$ is defined as:

$$\Pi(W) = \begin{cases} W/\|W\|_F & \text{if } \|W\|_F > 1 \\ W, & \text{otherwise} \end{cases}.$$

Algorithm 1 Learning of CBM

---

Data: $\{X^{(i)}\}_{i=1}^n$: n sample social dynamics
Data: $T_w$: scale of the filters
Data: K: number of filters
Result: $\{W_k\}_{k=1}^K$: solution filters
Result: σ, β: additional model parameters
$W_k^{[-1]} = W_k^{[0]}$ random initialization $\forall k$
σ = β = 1
$\lambda = \sigma^2 t_h/\beta$
r = 0
repeat
    r = r + 1
    for i = 1 to n do
        for k = 1 to K do
            $\{h_k^{(i)}\}_{k=1}^K$ = optimize_over_h $(X^{(i)}, \{W_k^{[r-1]}\}_{k=1}^K), \sigma, \beta)$
        end
    end
    for k = 1 to K do
        $t_{W_k} = \alpha/\Sigma_i\|h_k^{(i)}\|_1^2$ $$y = W_k^{[r-1]} + \frac{r-2}{r+1}(W_k^{[r-1]} - W_k^{[r-2]})$$

$$W_k^{[r]} = \Pi(y - t_{h_k}\nabla f_1(y))$$

end $$\sigma = \left(\frac{1}{n}\sum_i \left\|X^{(i)} - \sum_k W_k^{[r]} \otimes h_k^{(i)}\right\|_F^2\right)^{\frac{1}{2}}$$

β =
until convergence;
return $\{W_k^{[r]}\}_{k=1}^K, \sigma,$ and β

---

One distinction is that instead of solving h until convergence as in Task 1, only a single update is conducted here. Task 3 calculates the close-form solution of MLE for α and β. Since the whole algorithm can be viewed as a case of coordinate descent, it is guaranteed to converge.

Specifying Parameters. Algorithm 1 has two parameters, $T_w$ and K, that need to be supplied by a user. The filter scale $T_w$ can be conveniently specified as any small number (e.g., letting $T_w \approx D$) without the need to worry about overlooking the structures at larger scales. This is because the high-level structures with larger scales are meant to be captured by the CBMs at higher levels.

Regarding the number of filters K, since CBM has a natural corresponding probabilistic model (i.e., P(X,h) according to Equation 3), a naive method is trying out a range of different K's and selecting the one that produces the highest Bayesian Information Criterion (BIC), where the latter is a standard metric for model selection. Doing so, however, is very expensive because it requires training a large number of CBMs. Therefore, the following three-step method is proposed for selecting K:

1. Pick a large K and train a CBM.
2. Sort all filters such that:

$$p \leq q \Leftrightarrow \sum_{i=1}^n \sum_{k=1}^p \|h_k^{(i)}\|_1 \geq \sum_i^n \sum_{k=1}^q \|h_k^{(i)}\|_1. \qquad (10)$$

Algorithm 2 Optimization over h

---

Data: X: a sample social dynamic
Data: $\{W_k\}_{k=1}^K$: filter matrices
Data: σ, β: model parameters
Result: $\{h_k\}_{k=1}^K$: solution activation vectors
$h_k^{[-1]} = h_k^{[0]}$ = random initialization $\forall k$
$t_{h_k} = \alpha/(\|W_k\|_1^2) \forall k$
$\lambda = \sigma^2 t_{h_k}/\beta$
r = 0
repeat
    r = r + 1
    for k = 1 to K do $$y = h_k^{[r-1]} + \frac{r-2}{r+1}(h_k^{[r-1]} - h_k^{[r-2]})$$

$$h_k^{[r]} = S_\lambda^+(y - t_{h_k}\nabla f_1(y))$$

end
until convergence;
return $\{h_k^{[r]}\}_{k=1}^K$

---

3. Plot the cumulative activation function F(m):

$$F(m) = \sum_{i=1}^n \sum_{k=1}^m \|h_k^{(i)}\|_1 \qquad (11)$$

and pick the new K as the position m* such that F(m*) starts to saturate (i.e., when dF/dm ≤ ε where 0<ε<<1 is a small positive number).

The idea behind our method is that, since sparsity is enforced on $h_k$'s using the one-norm in Equation 6, the irrelevant filters $\{W_{m^*+1}, \ldots, W_K\}$ will all have very low activations compared to that of the relevant filters $\{W_1, \ldots, W_{m^*}\}$. The advantage of this approach is that it requires training only one (instead of a large number of) CBM, and hence it is much more efficient.

Figure 5:
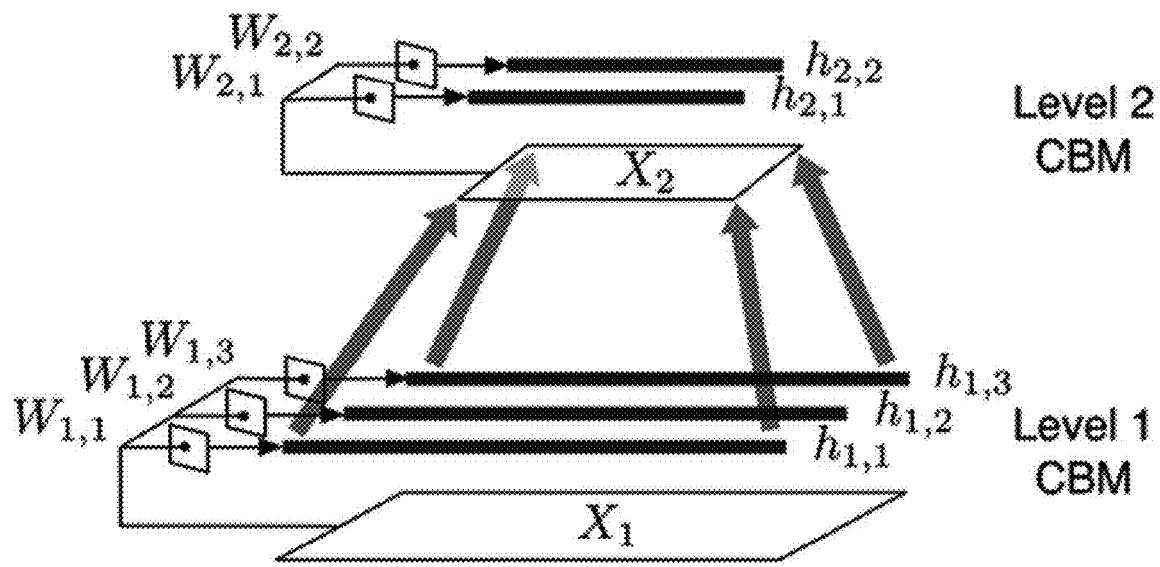
FIG. 5 is a diagram illustrating a two-level recursive CBM (RCBM), wherein the upper-level input dynamic is constructed by max-pooling the activation vectors that are one level below it.

RCBM: Recursive CBMs. To capture the compositional structure of social dynamics across different scales, RCBM, which is a hierarchical architecture constructed by stacking together multiple CBMs (as illustrated in FIG. 5) is used. For some new notations, l is used to represent any variable at the l-th level, including $X_l$ (input dynamic of level l), $h_{l,k}$ (the k-th activation vector at level l), $W_a$ (the k-th filter matrix in level l) and $K_l$ (the number of filters in level l). Also, L denotes the total number of levels of an RCBM.

Suppose a CBM has been trained with K=3 following the procedures described above, like the Level 1 CBM in FIG. 5. To raise the level of abstraction, the input dynamics at level 2 (i.e., $X_2$) is constructed by down-sampling the lower-level activation vectors (i.e., $h_{1,1}$, $h_{2,1}$, and $h_{3,1}$) by a factor of c using a non-linear max-pooling, which takes the maximum value among consecutive c values. For example, since $K_1$=3 in FIG. 5, $X_2$ will have three rows of length $$\left[\frac{T+T_w-1}{3}\right],$$

where $T+T_w-1$ is the length of $h_{k,1}$. Moreover, the Values of $X_2$ Will be Assigned as $X_2[d,t]=\max_{s\in\{1,\ldots,c\}} h_{d,1}[c(t-1)+s]$.

After doing max-pooling for each sample, a set of level-2 dynamics (i.e., $X_2$) is obtained for the whole dataset. These level-2 dynamics can then be used as if they are a set of new social dynamics and train another CBM as before, like the Level 2 CBM in FIG. 5. Repeating this layer-wise training process for L times, an RCBM of L levels is obtained. Note that the number of filters $K_l$ at each level can be different; for example, in FIG. 5, $K_1=3$ and $K_2=2$. Also, note that even if the filter scale $T_w$ remains constant across different levels, the higher-level filters will still detect larger-scale dynamics, i.e., a level-l filter effectively looks at the dynamics of scale $c^{l-1} T_w$. Besides focusing at larger scales, a higher-level filter can also detect the dynamics of higher levels of abstraction, because it is trained using the lower-level activation vectors, which are themselves a non-linear transformation of their input dynamics. This is how RCBM can recognize the compositional structures of social dynamics across different scales and levels of abstractions.

RCBM Features. While RCBM inherits all the features of CBM, it has two additional features that are reflected in its name. First, all levels of an RCBM share the same structure, hence the name "recursive". This ensures that the numbers of activation vectors remain roughly the same across different levels. This is in sharp contrast to other convolutional deep architectures, where the number of activation vectors becomes $K^2$ from the second level; this seriously limits the efficiency and scalability of previous algorithms. Second, by using Equation 3, the joint probability of the entire RCBM can be decomposed using Bayes' rule:

$$P(X, h) = \prod_l P(X_l \mid h_l; W_l, \sigma_l) P(h_l; \beta_l) \quad (12)$$

$$= \frac{1}{Z} \exp\left(\sum_l \frac{\left\|X_l - \sum_k W_{l,k} \otimes h_{l,k}\right\|_F^2}{-2\sigma_l^2} + \frac{\sum_k \|h_{l,k}\|_1}{-\beta_l}\right),$$

hence the name "Bayesian." Moreover, it is noted that RCBM is normalized locally according to Equation 3. Therefore, the partition function Z in Equation 12 can be calculated efficiently using Equation 3 and the first line of Equation 12; this makes various inferences of RCBM efficient. Finally, such a probabilistic formulation also enables many new applications such as conditional inferences and anomaly detection.

Model Summary. To summarize, RCBM possesses three attractive properties:

Good solution quality: under assumptions A1 to A3, RCBM is capable of identifying compositional structures of social dynamics that have provable convergence qualities. This is attributed to our specialized convolution operators (⊛ and ⊚) and stepsize assignment (Equation 9).

Efficiency: the learning of RCBM is efficient and can scale much better than existing convolutional deep learning methods. This is attributed to our specialized convolution operators, stepsize assignment, and the recursive structure.

Wide applicability: RCBM can be applied to a range of applications. In one example, it can be used as the feature extractor for supervised tasks. In another example, its probabilistic formulation (Equation 12) enables various conditional inferences and anomaly detection.

While all these properties are verified empirically, the first two are properly established in U.S. Provisional Patent Application Ser. No. 62/388,074, filed Jan. 15, 2016, and titled "PATTERN IDENTIFICATION AND DATA-DRIVEN ENGINEERING OF SOCIAL DYNAMICS," which is incorporated by reference herein in its entirety and for its analyses of the convergence properties and runtime complexity of the RCBM implemented herein.

Experimental Results for RCBM Applications

Extensive experiments were conducted using RCBM and historical time-series social media data from the TWITTER® and YELP® platforms in the following three directions: (1) the evaluation of RCBM per se, (2) compositional structures in TWITTER® and YELP® datasets discovered using RCBM, and (3) two new applications enabled by RCBM.

Dataset Descriptions

TWITTER® Dataset. A Twitter dataset that consisted of 181M postings from 40.1M users and 1.4 B following relationships was used. To enumerate the information tokens that carry social dynamics (as defined in herein), in contrast to a few previous authors who use hashtags, it was found that the discussion of many interesting events does not include a hashtag. Therefore, a more general definition using bursty keywords, i.e., keywords that attract intense attention during a short period of time was adopted. Common terms (e.g., "the", "and", etc.) were removed and classic method was used to detect bursty keywords. A total of 0.5M bursty keywords were detected where their corresponding social dynamics were extracted. For better representativeness, the dynamics with at least 5 per-min peak usages and 20 total usages around the 30 minutes during their peak times were selected, yielding a 13K-sample dataset of social dynamics.

Each social dynamic was characterized using seven features based on the types of users involved and certain graph statistics. For features based on the types of users involved, five types of users were considered. "Initiators" denoted the ones who used this keyword before any of his or her friends did. "First-time propagators" and "first-time commentators" denoted the users who retweeted and tweeted, respectively, about this keyword after his or her friends using the same keyword before. "Recurring propagators" and "recurring commentators" denoted the users who retweeted and tweeted, respectively, the same keyword that he or she himself or herself used before. For graph statistics, the evolving graph corresponding to each keyword's usages was built, and the graph's diameter and the size of the largest connected component LCC were used, as others have shown are informative.

YELP® Dataset. The YELP® dataset consisted of 1.1M reviews made by 252K users (with 956K friendship edges among them) during a ten-year period. The target of these reviews were 42K businesses in Las Vegas, Phoenix, Edinburgh, Madison, and Waterloo; each of these businesses was considered as an information token. For better representativeness, the businesses with at least 40 reviews (i.e. one review per season, on average) were selected, yielding a 5.3K dataset of social dynamics. Each social dynamic was characterized using six evolving statistics of a business: its numbers of reviews and tips, its average relative rating, the experience (measured by the number of previous reviews)

and influence (measured by the number of friends) of the business's reviewers, and the amount of user responses (that tag each review as useful, funny, or cool). Similarly, these dimensions provided good interpretability to the compositional structures found in the YELP® dataset.

Evaluation of RCBM

Figure 6:
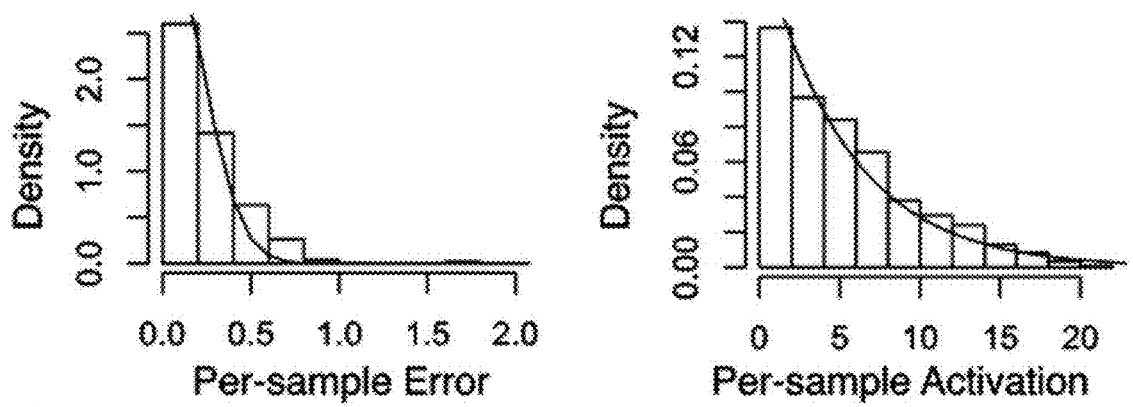
FIG. 6 shows graphs illustrating empirical versus fitted distributions of error and activation using a particular TWITTER® dataset.
Figure 7:
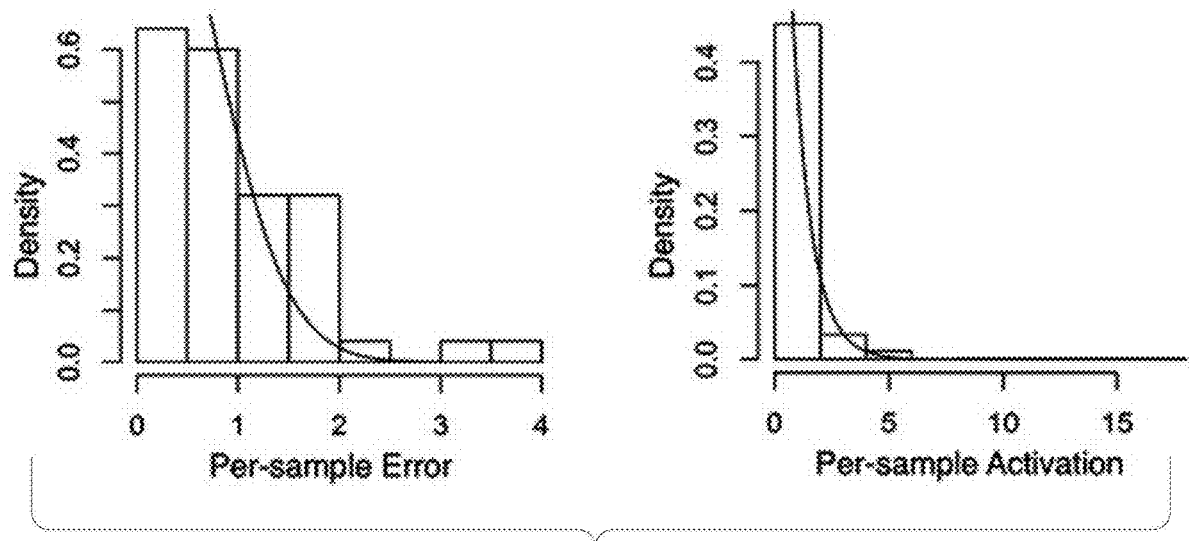
FIG. 7 shows graphs illustrating empirical versus fitted distributions of error and activation using a particular YELP® dataset.

Parametric Forms. The distributional assumptions made in Equation 3 were first verified. To this end, each of the two datasets was used to train a one-level CBM. For each sample X, the per-sample error $\|X-\Sigma_k W_k \otimes h_k\|_F$ and the per-sample activation $\Sigma_k \|h_k\|_1$ were calculated. Then their empirical distributions were compared to their model distributions (i.e., according to Equation 3). From the results in FIGS. 6 (TWITTER® dataset) and 7 (YELP® dataset), the empirical distributions and the model distributions seem to match reasonably well. A close examination of the activation vectors confirms that sparsity is enforced effectively such that for each activation vector, most of its elements are exactly zero. These observations support the validity of our formulations in Equations 3 and 6.

Runtime and Solution Quality. The runtime performance and the solution quality of RCBM was then evaluated against deep-learning and non-deep-learning methods. For the baseline deep-learning method, convolutional autoencoder (cAE) was used, as it represents the state-of-the-art convolutional deep learning algorithm. For the current method, two versions of RCBM were tested: one determines the stepsizes using line search (RCBM-LS); the other uses the proposed fixed stepsize in Equation 9 (RCBM-FS). Using each method, the sample sizes were varied in the range of 100 to 10000 and a two-level model with 10 filters was trained at each level. The solution quality of the learned models was measured using perplexity calculated using 3000 randomly sampled held-out test data. Intuitively, perplexity measures how closely the model distribution resembles the empirical distribution, where a lower value indicates a better model. All experiments were run using 10 repetitions, where both the means and the standard deviations were reported.

Figure 8:
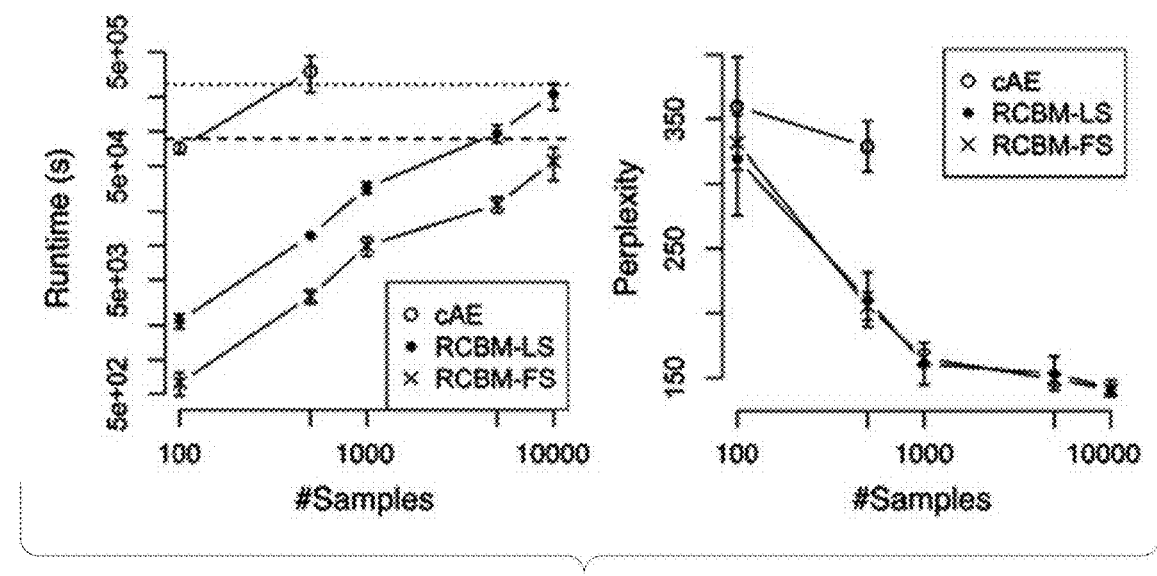
FIG. 8 shows graphs illustrating runtime and perplexity comparisons among deep-learning methods using the TWITTER® dataset.

From the left panels of FIGS. 8 (TWITTER® dataset) and 9 (YELP® dataset), it is first observed that RCBM-LS and RCBM-FS ran significantly faster than cAE. Indeed, while cAE scaled up to 500 samples, both RCBM-LS and RCBM-FS scaled to 10,000 samples. Moreover, RCBM-FS ran much faster than RCBM-LS: while it may take more than 3 days to train an RCBM-LS with 10,000 samples, it took around 17.5 hours using RCBM-FS. Accordingly, RCBM-FS achieved a 4×~6× speedup compared to RCBM-LS, or a 30×~100× speedup compared to cAE. Such a significant speedup is attributed to several carefully-designed features, including the fixed stepsizes, the specialized convolutions, and the recursive structure of RCBM.

Figure 9:
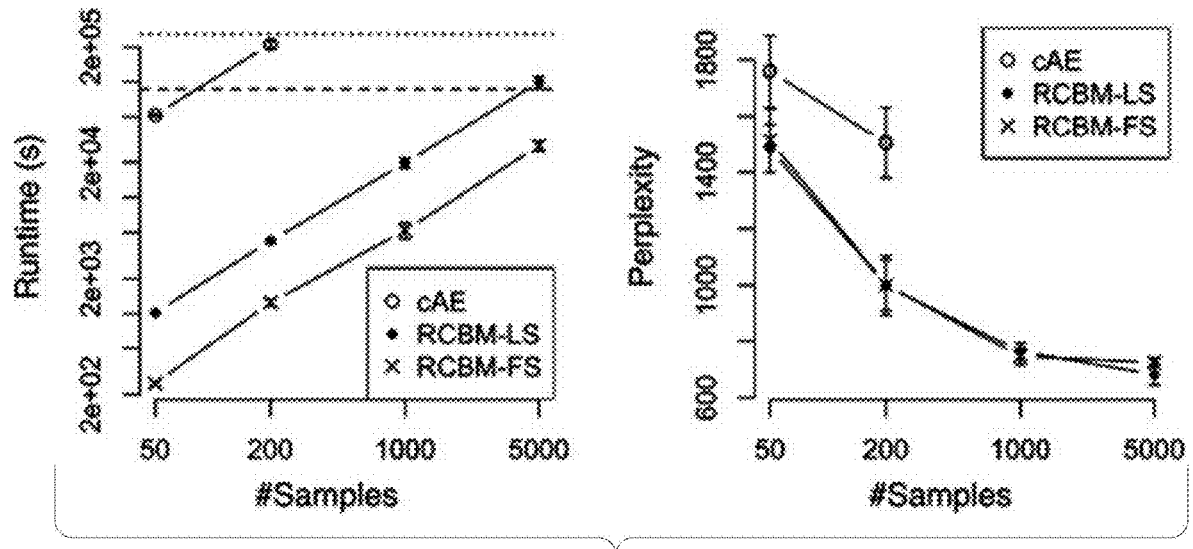
FIG. 9 shows graphs illustrating runtime and perplexity comparisons among deep-learning methods using the YELP® dataset.

For solution quality, it can be observed from the right panels of FIGS. 8 and 9 that RCBM-LS and RCBM-FS performed comparably and both performed considerably better than cAE. This is because they both incorporate the specialized convolution operators that exploit the heterogeneity of social dynamics, which is not considered by the conventional convolutions used in cAE.

Figure 10:
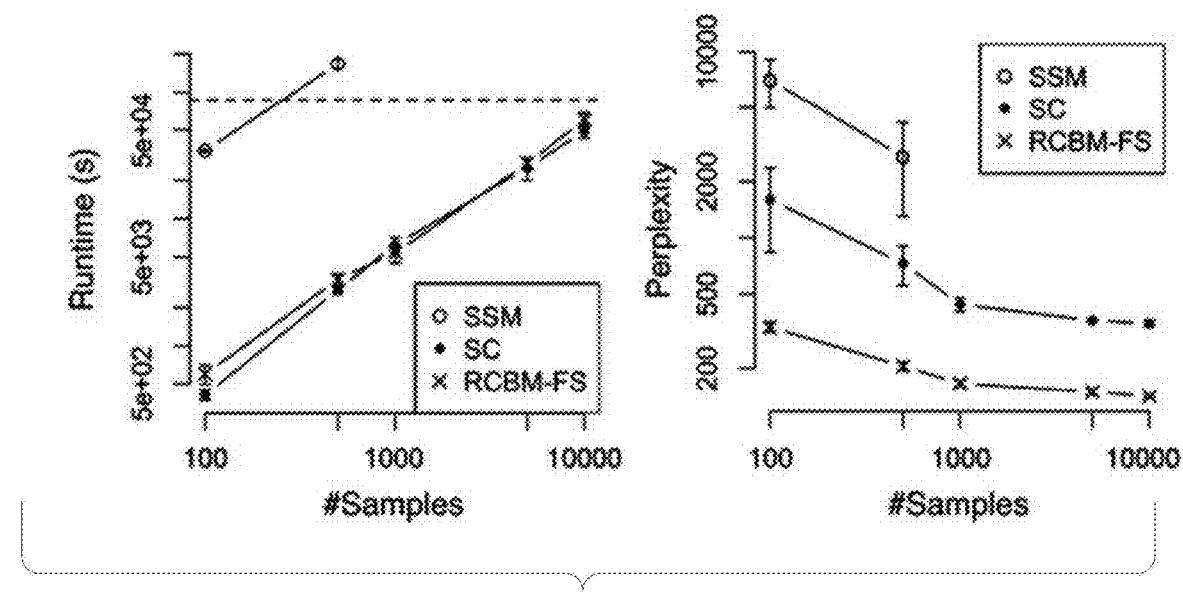
FIG. 10 shows graphs illustrating runtime and perplexity comparisons among non-deep-learning methods using the TWITTER® dataset.
Figure 11:
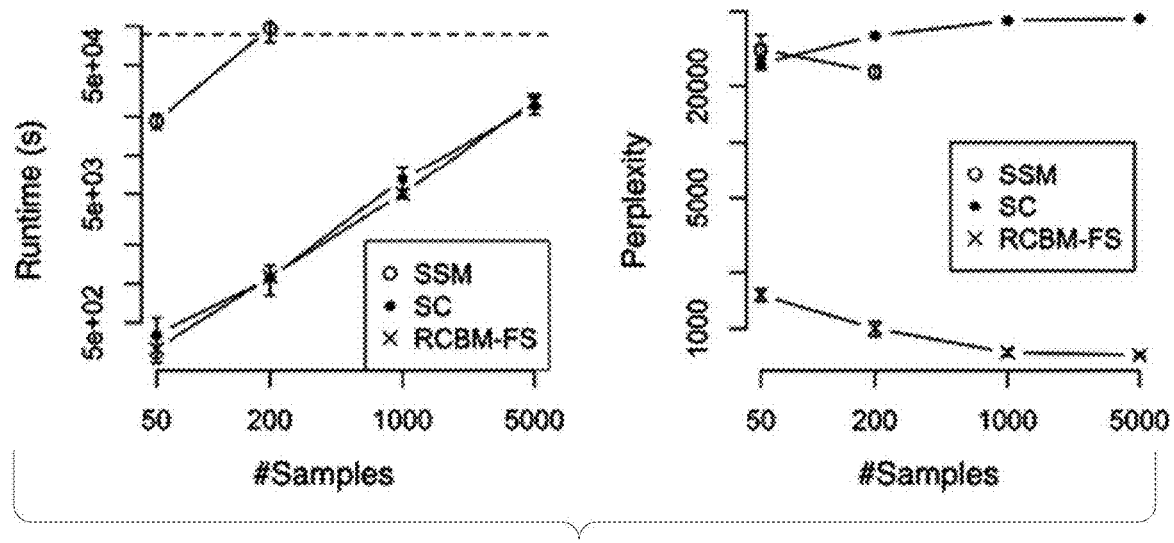
FIG. 11 shows graphs illustrating runtime and perplexity comparisons among non-deep-learning methods using the YELP® dataset.

To gain further insight, the current method (i.e., RCBM-FS) was compared against two non-deep-learning methods that also incorporate latent factors, i.e., state space model (SSM) and sparse coding (SC). For a fair comparison, SSM and SC were set up such that each of them had an equal or slightly larger number of parameters compared to that of RCBM-FS. Similar to FIGS. 8 and 9, these models were trained using the TWITTER® (FIG. 10) and YELP® datasets (FIG. 11) and presented the runtime and perplexity results.

In terms of runtime (i.e., the left panels of FIGS. 10 and 11), it is observed that SC and RCBM-FS ran much faster than SSM. This is because the standard expectation-maximization (EM) training of SSM involves multiplication and inversion of matrices. Therefore, the complexity for one optimization step is $O(n(K^2 T^2 + D^2 T^2) + K^3 + D^3)$, which can be very high for large n, K, T, or D. Further, despite that SC is theoretically faster than RCBM by a constant factor $T_w$, it was observed that they have comparable runtime in practice. This is attributed to the careful design of stepsize selection, which contributes to an about 4× to an about 6× runtime speedup (see the runtime of RCBM-LS and RCBM-FS in FIGS. 8 and 9).

In terms of solution quality, (see the right panels of FIGS. 10 and 11), it is observed that RCBM-FS performed much better than SSM and SC. The reason why SSM performed poorly is that it makes a rather strong modeling assumption that the dynamical transition of the hidden factors are both linear and time-invariant, which is typically not true in practice. As for SC, the reason is more involved. For the TWITTER® dataset where the majority of time series have a single peak and are aligned accordingly, SC performed better than SSM because it makes fewer assumptions about the time series dynamics. Still, SC performed poorly compared to RCBM, because it wastes the majority of its parameters in capturing the global signatures at the same scale. In contrast, RCBM-FS used its parameters more efficiently by exploiting the local signatures of different scales. For the YELP® dataset where the majority of times series have multiple peaks that cannot be aligned, SC performed worse than SSM. Indeed, the perplexity even increased as the number of samples grew, showing that the incapability of SC to deal with time-shifts represents a serious issue when the time series are not pre-aligned.

Figure 12:
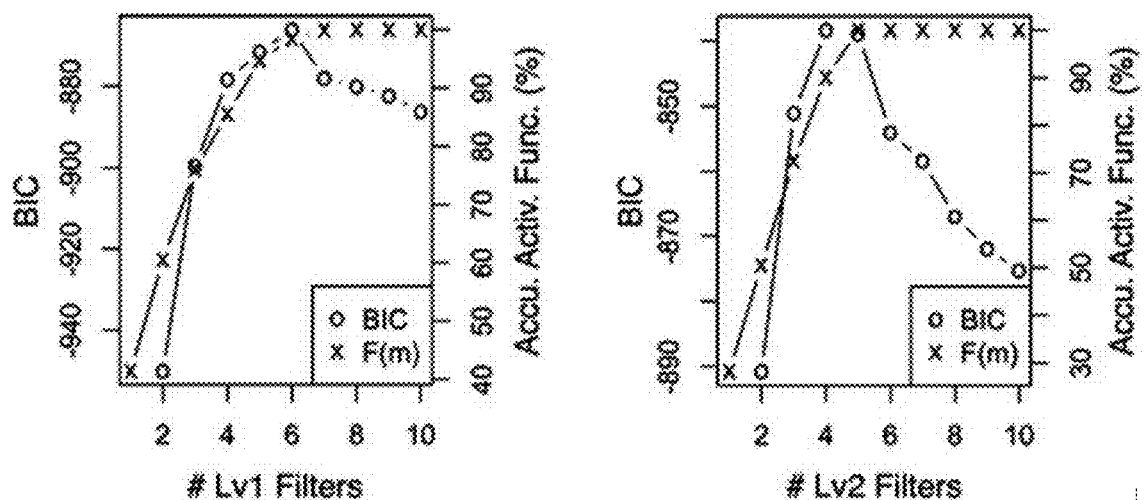
FIG. 12 shows graphs illustrating Bayesian Information Criterion (BIC) and accumulation function of level-1 (left) and level-2 (right) filters using the TWITTER® dataset.

Efficient Selection of K. Next, the naive and the current methods in selecting the best number of filters K were compared; both methods are described above. With each of the two datasets, two-level RCBM's were trained with both methods. For the naive method based on Bayesian Information Criterion (BIC), the BIC was calculated while fixing K=10 for one of $K_1$ and $K_2$ and varying the other; this required training 20 RCBM's in total. For the current method, only one RCBM was trained using $K_1=K_2=10$ while plotting the cumulative activation function F(m) in Equation 11 for both levels. The results are summarized in FIGS. 12 (TWITTER® dataset) and 13 (YELP® dataset), wherein good choices of K are indicated by peak BICs and the points where F(m) saturates. In both panels of both figures, it is observed that the choices of K's suggested by BIC and F(m) are nearly identical, although it requires training 20 RCBM's to obtain the BIC curves but only one to obtain the F(m) curves. Moreover, manual inspection confirms that for the TWITTER® dataset, $W_1$~$W_5$ of both levels consisted of clearly interpretable filters, whereas $W_6$~$W_{10}$ of both levels consisted of plain noise; for the YELP® dataset, similarly, the first six (four) filters in level one (two) are clearly interpretable, whereas the last four (six) filters in level one (two) consisted of plain noise. Accordingly, it is concluded that the current method of choosing K is both efficient and effective.

Compositional Structures of Social Dynamics

The compositional structures of social dynamics were investigated by inspecting the learned filters (i.e., W's in Equation 12) in RCBM. It is first noted that this analysis is in sharp contrast with analyses presented by others. First, the goal in other analyses is finding representative samples, which is essentially clustering; the goal in the present case, on the other hand, is finding structures that best characterize social dynamics, which is essentially decomposition. Second, the current method is compositional and scale-free.

Compositional Structures in the TWITTER® Dataset. For the TWITTER® dataset, $K_1=K_2=5$ was used according to the experiment in FIG. 12 and a two-level RCBM was trained. The level-1 filters corresponded to compositional structures of seven minutes, whereas the level-2 filters corresponded to compositional structures of 30 minutes. All these filters are visualized in FIGS. 14 and 15. In both figures, the filters are ranked according to their corresponding activation strength (i.e., Equation 10).

Figure 14:
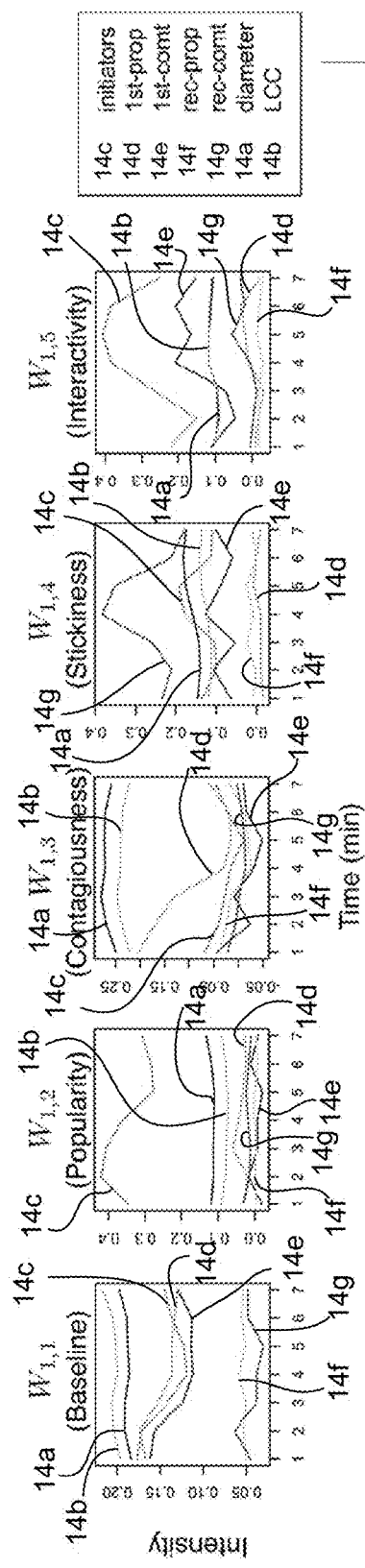
FIG. 14 shows graphs illustrating the level-1 compositional structures of the TWITTER® social dynamics identified using a two-level RCBM.
Figure 15:
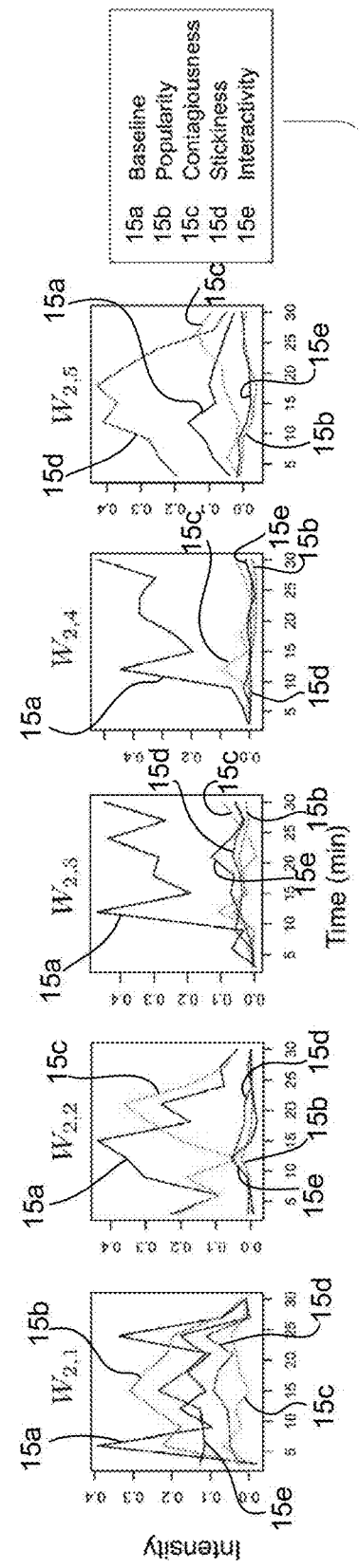
FIG. 15 shows graphs illustrating the level-2 compositional structures of the TWITTER® social dynamics identified using a two-level RCBM.

Level 1 Structures in the TWITTER® Dataset. The filter $W_{1,1}$ in FIG. 14 represents the baseline of typical TWITTER® social dynamics. It corresponds to a strong community indicated by the 14a and 14b of the graph diameter and LCC (largest connected component), respectively. Such a strong community is mainly attributed to the initiators (14c), first-time propagators (14d), and first-time commentators (14e), but not the recurrent propagators (14f) and commentators (14g). Such a baseline structure matches the responsive and light-weighted nature of the TWITTER® platform. The filter $W_{1,2}$ characterizes the popularity of social dynamics. It mainly consists of the number of initiators, with minor first-time propagators, characterizing how popular a piece of information is from the external sources outside of the TWITTER® platform, for example, TV, web news, etc. The filter $W_{1,3}$ characterizes the contagiousness of social dynamics that consists of mainly first-time propagators (14d) and the corresponding strong community indicated by the diameter (14a) and the LCC (14b), despite only a small number of initiators (14c). The filter $W_{1,4}$ characterizes the stickiness of social dynamics, which consists of mainly recurrent commentators (14g) with smaller but proportional numbers of initiators (14c) and first-time commentators (14e). It characterizes the capability of a social dynamic to retain the attention of the users and keep commenting about it. It is noted that the community-related dynamics (diameter and LCC) are also weaker since the corresponding community is much smaller compared to the community of the filter $W_{1,3}$. The filter $W_{1,5}$ characterizes the interactivity of social dynamics, which has the largest magnitude of first-time commentators (14e) among all level-1 filters. It characterizes the capability of a social dynamic to motivate users to spend time and comment on it, instead of merely passing it along (i.e., propagating it) to other users.

Level 2 Structures in the TWITTER® Dataset. We now turn to investigate the level-2 filters as visualized in FIG. 15. Note that each individual component on the right of FIG. 15 corresponds to one level-1 filter in FIG. 14, and that the time scale now is 30 minutes instead of 7 minutes that is the case of FIG. 14. This is because the level-2 filters are intended to capture how the level-1 structures interact with one another and form larger-scale structures with high-level meanings, which is a unique feature of RCBM.

The filter $W_{2,1}$ (baseline is indicated by 15a) characterizes a three-stage structure that is driven mainly by popularity (the 15b), but accompanied by different structures in each of its stages. It is accompanied firstly by contagiousness (15c), secondly by interactivity (15e) and stickiness (15d), and thirdly by combinations of the three. The contagiousness dips in the second stage, but gets enhanced again in the third stage, suggesting that contagiousness alone is not enough to sustain long-lasting social dynamics. The filter $W_{2,2}$ is mainly composed of strong contagiousness, which dips at around time $t=12$, and is later continued and enhanced by interactivity and stickiness. Manual inspection shows that the contagiousness results from reporting some facts before $t=12$, whereas it results from commenting about the facts, for example, from famous bloggers, after $t=12$. The filter $W_{2,3}$ and $W_{2,4}$ are also driven by contagiousness, but their corresponding contagiousness components have a smaller magnitude. The key difference between the two is that in $W_{2,3}$, strong interactivity and stickiness are generated as a result of the initial contagiousness, which is much weaker in the case of $W_{2,4}$. As a result, the dynamics with top 10% $W_{2,3}$ activations reaches more than three times larger audiences compared to the case of the dynamics with top 10% $W_{2,4}$ activations. The filter $W_{2,5}$ exhibits a clear two-stage structure. The second stage characterized by contagiousness (15c) seems to result from the first stage that is characterized by strong stickiness. Manual inspection shows that such a structure consists of committed core users and responsive peripheral users, which is consistent with the leader-follower pattern reported by others. In the present method, however, the local structures of the pattern as well as the interaction among these structures are decomposed and analyzed in much greater detail.

To summarize, three representative ways were found where smaller-scale signatures interacted and formed larger-scale structures with higher-level meanings. First, it was found that popularity can stimulate interactivity, stickiness, and contagiousness (i.e. $W_{2,1}$). Second, it was found that contagiousness can generate interactivity and stickiness, which, in turn, enhance contagiousness (e.g., $W_{2,2}$ and $W_{2,3}$). Third, it was found that stickiness beyond a certain threshold can generate contagiousness (e.g., $W_{2,5}$).

Figure 13:
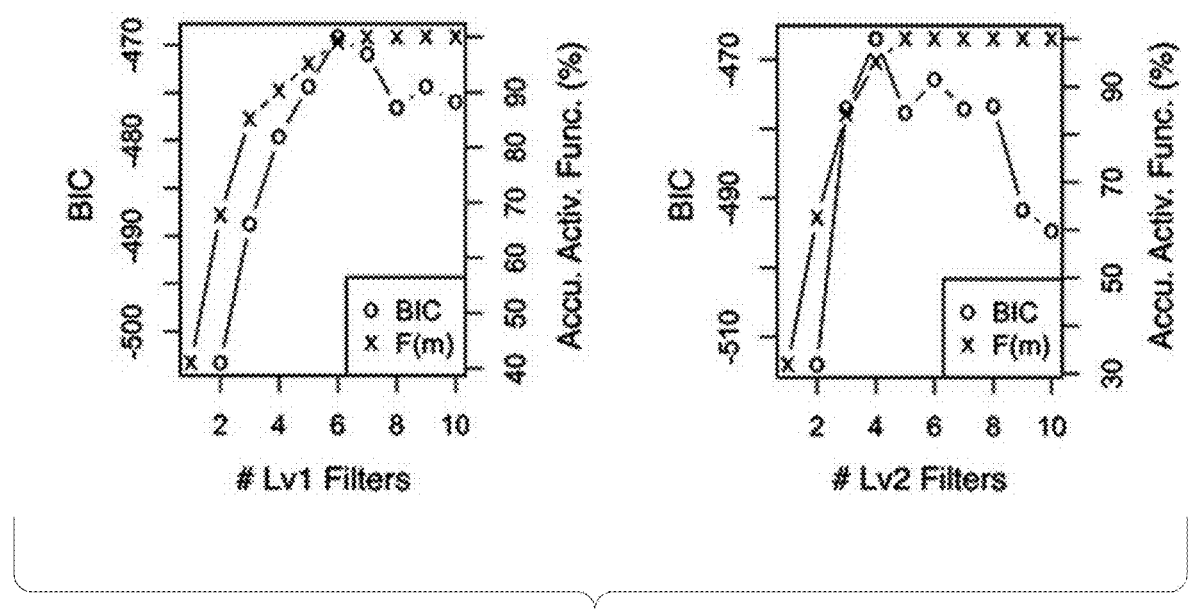
FIG. 13 shows graphs illustrating BIC and accumulation function of level-1 (left) and level-2 (right) filters using the YELP® dataset.

Compositional Structures in YELP® Dataset. For the YELP® dataset, $K_1=6$, $K_2=4$ according to the experiment in FIG. 13 and train a two-level RCBM were used. The level-1 filters corresponded to compositional structures of one year, whereas the level-2 filters corresponded to that of six years. Again, these filters were ranked according to their corresponding activation strength (i.e., Equation 10) and visualized in FIGS. 16 and 17.

Figure 16:
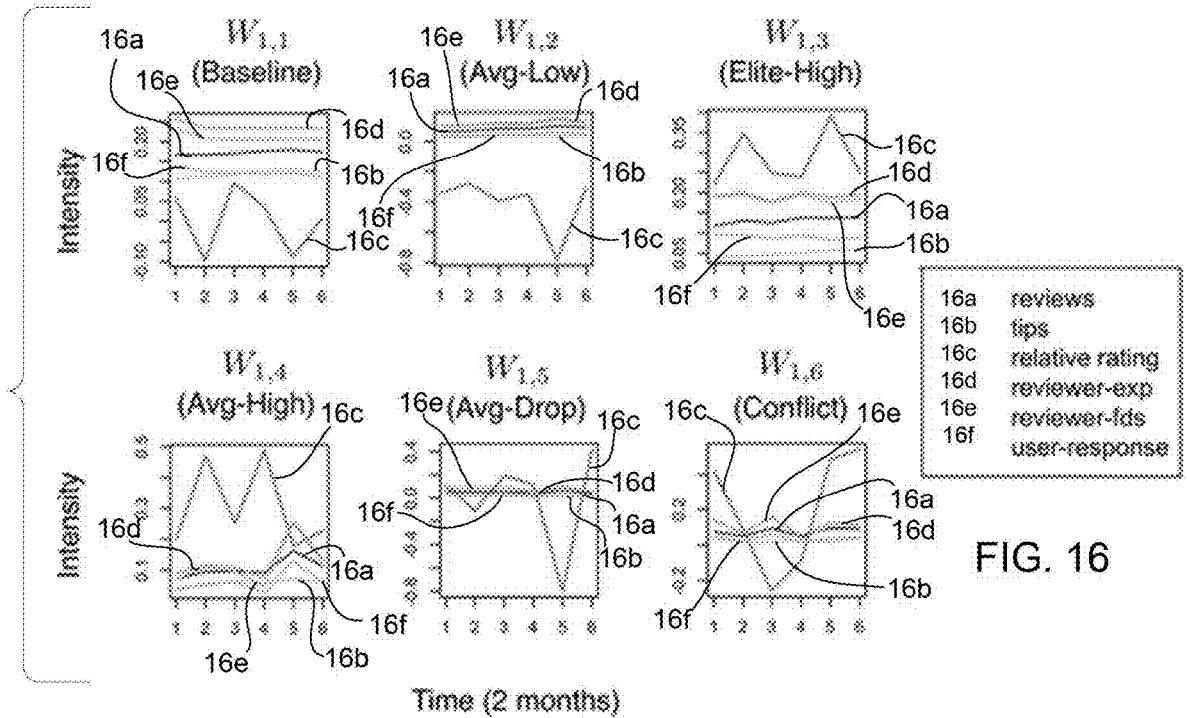
FIG. 16 shows graphs illustrating the level-1 compositional structures of the YELP® social dynamics identified using a two-level RCBM.
Figure 17:
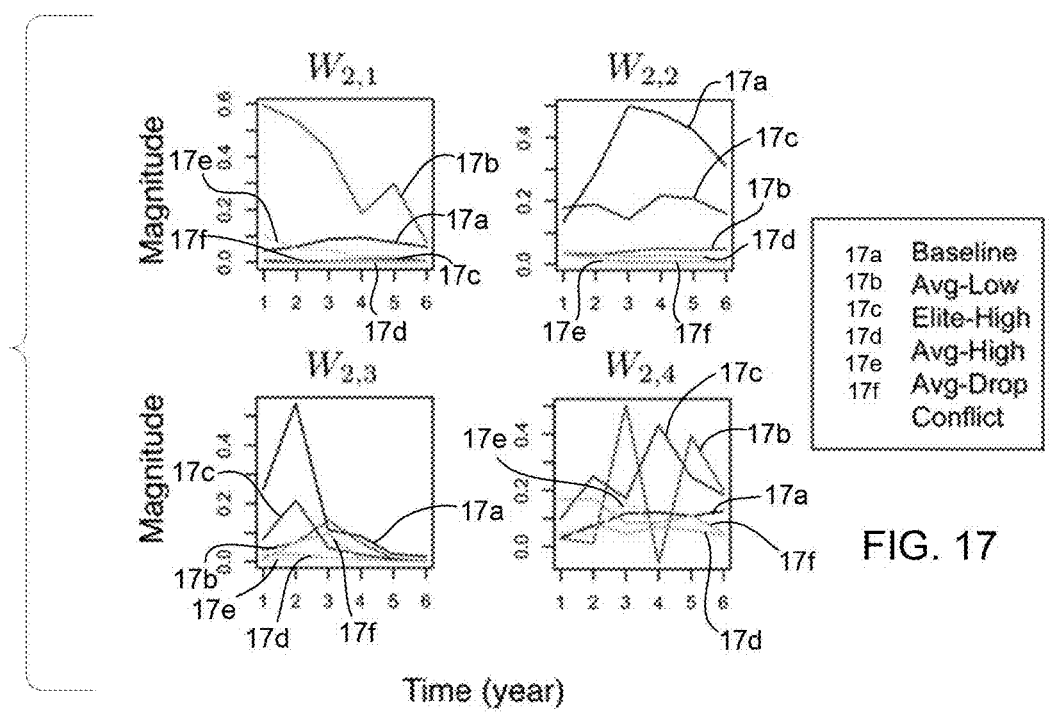
FIG. 17 shows graphs illustrating the level-2 compositional structures of the YELP® social dynamics identified using a two-level RCBM.

Level 1 Structures in the YELP® Dataset. Each level-1 structure indicates a particular level of rating (16c in FIG. 16) given by one of the two types of reviewers: a smaller number of elite reviewers who have a higher level of experience (16d) and influence (16e), and a larger number of average reviewers who are the opposite of their counterparts. The filter $W_{1,1}$ in FIG. 16 represents the baseline of a typical YELP® social dynamic. It corresponds to neutral ratings (indicated by the small magnitude of the 16c) given by elite reviewers who are more. Since this filter gets activated the most among all level-1 filters, it is consistent with the fact that the majority of YELP® contents are provided by a relatively small set of elite users. Moreover, it is consistent with the fact that most businesses rated on the YELP® platform have ratings close to the overall average (i.e., around 3.7 stars). The filter $W_{1,2}$ detects the cases when a business is given low ratings by average reviewers; the filter $W_{1,3}$ characterizes the cases when a business is given high ratings by elite reviewers; and the filters $W_{1,4}$ and $W_{1,5}$ indicate the cases when high and low ratings are given by average users, respectively. Note that there is a difference between filters $W_{1,5}$ and $W_{1,2}$: in the former case, the rating for the business was neutral for several months, but dropped suddenly at $t=5$; In the latter case, the rating was low from the beginning, and became particularly so at $t=5$. In filter $W_{1,5}$, the rating oscillates significantly, where the extreme values at t=1,3,5 are all driven by elite users. This seems to characterize a conflict in rating a business among different groups of elite users, comparable to the edit wars in Wikipedia.

Level 2 Structures in the YELP® Dataset. The level-2 structures of YELP® social dynamics are summarized in FIG. 17. Note that the time scale now is six years instead of the one-year timescale that is the case of FIG. 16. Again, each individual component on the right of FIG. 17 corresponds to one level-1 filter in FIG. 16. The filters $W_{2,1}$ and $W_{2,2}$ indicate cases wherein a business was consistently given low and high ratings by average and elite users, respectively. While it is interesting to see these two common long-term dynamics that present on the YELP® platform, it is equally informative to see that the opposite cases were uncommon. That is to say, from the data, it is uncommon to see a business that was consistently given high ratings by average users, or low ratings by elite users. Moreover, the filters $W_{2,3}$ and $W_{2,4}$ both show disagreement in the ratings of average versus elite reviewers. Indeed, in $W_{2,3}$, the high ratings from the elite reviewers (17c) at t=2 is substituted by the low ratings from the average reviewers (17b) at t=3, accompanied by increased conflict (17f) among elite reviewers. Further, the situation becomes more dramatic in filter $W_{2,4}$, where multiple such transitions take place with one-year gaps.

To summarize, representative ways were found where the ratings from the average and the elite YELP® reviewers can interact in different time scales. Particularly, three common long-term structures seem to have emerged: (1) low ratings by many average users, (2) high ratings by many elite users, and (3) sharp disagreement and transitions in the ratings between the average versus elite users.

Exemplary Applications of RCBM

Anomaly Detection. An advantage of RCBM is its probabilistic formulation (i.e., Equation 12) that assigns a probability to every sample social dynamic. Therefore, a natural application is to detect abnormal social dynamics with extremely-low probabilities. A list of such anomalies detected in the TWITTER® dataset is summarized in the table of FIG. 18, wherein exemplary tweets are listed and the corresponding keywords underlined. Similarly, a list of such anomalies detected in the YELP® dataset is summarized in the table of FIG. 19, wherein example reviews are listed with their corresponding ratings (i.e., in the parentheses).

Anomalies in the TWITTER® Dataset. The anomalies detected in the TWITTER® dataset (see the table of FIG. 18) roughly consist of four groups. The anomalies in a first group correspond to major disasters, including the 2009 tsunamis in American Samoa and Indonesia, and the plane crash in Manhattan. A second group of anomalies corresponds to urgent messages, like the national emergency of swine flu and the 2009 Iran election. A property of the first two groups is that they are very contagious and can form large communities very quickly. However, there is relatively little interaction among users compared to other social dynamics with comparable levels of contagiousness. A third group of anomalies corresponds to the shutdown or malfunctioning of major online services like the GMAIL® or YOUTUBE® services. A fourth group are machine-generated messages, which typically correspond to tweets about some marketing promotion. The last two groups have a common characteristic of having a lot of popularity but barely any contagiousness, stickiness, and interactivity compared to typical social dynamics. It is noted that detection of all these four groups of anomalies has useful applications. Indeed, for the first three groups, although they happen rarely, detecting them early and being able to respond to them can have a huge impact. For the last group, it is useful in detecting the online scam.

When analyzing these anomalies, a legitimate question is whether these anomalies can be trivially detected by frequency-based rankings. It turns out that the list in the table of FIG. 18 is very different from the one generated by ranking keywords using their frequencies. Indeed, only twelve out of top-100 frequent keywords are considered to be associated with anomalies, which is, equivalently, 27 out of top 500 or 46 out of top 1000. To gain further insights, the table of FIG. 20 lists some tweets and keywords that are used the most frequently but are associated with normal social dynamics. They can be roughly divided into three groups: holidays, common emotion, and trendy events. It can be observed that each tweet in this table seems to be associated with more organic interactions compared to the cases in the table of FIG. 18.

Anomalies in the YELP® Dataset. The anomalies detected in the YELP® dataset (see the table of FIG. 19) roughly consist of three groups. The anomalies in a first group correspond to adult entertainment businesses. A property of this group is the strong yet distinct preferences from individual reviewers, some calling it "heaven" and giving five stars, while others saying they "got almost nothing out of it" and give only one star. Further, these radically different ratings are mixed uniformly in time, which is in sharp contrast to the transitions that present in $W_{1,6}$ of FIG. 16 or in $W_{2,3}$ and $W_{2,4}$ of FIG. 17 where each transition takes months or years. A second group of anomalies corresponds to exceptionally poor services or facilities for a prolonged period of time. A property of this group is that they consistently receive the lowest possible ratings from both average and experienced reviewers. While long-term negative ratings from average reviewers are common (i.e., see $W_{2,1}$ of FIG. 17), this group of anomalies gets consistent negative ratings from elite reviewers as well. A third group corresponds exclusively to those restaurants that are constantly outstanding. They receive the highest possible ratings frequently, mostly from average users but also from experienced users. Common words that can be found from the reviews of this group of businesses include "consistently excellent," "lives up to the hype," and "exceeds expectation." Moreover, unlike the case of filter $W_{2,2}$ of FIG. 17 where positive ratings are given by elite users, these businesses consistently receive top ratings from average reviewers. These anomalies, again, cannot be trivially detected using frequency-based rankings. Indeed, less than 15% of these anomalies appear in the lists of top-100 businesses in terms of the numbers of reviews, tips, and check-ins. This confirms an advantage of RCBM in detecting anomalies according to their social dynamics, which is based on the common compositional structures learned directly from a large quantity of unlabeled data.

Feature Extraction and Forecasting. When deep learning is used as the unsupervised feature extraction module in Computer Vision and Natural Language Processing, it produces state-of-the-art results in various supervised learning tasks. Similarly, RCBM's potential is explored herein for supervised learning in social applications. For the TWITTER® dataset, the total number of users of a hashtag was attempted to be forecast; for the YELP® dataset, the average daily checkins of a business during 2014 was attempted to be forecast.

For each dataset, a two-level RCBM was built using a training set. Then, for each testing sample, its activation vectors were obtained using Algorithm 1, above. To prevent the use of unavailable information during forecasting, for the TWITTER® dataset, all samples up to November 31 were used as the training set, and all samples in December as the testing set. Also, for each test sample, only the data up to its peak usage time was used. Similarly, for the YELP® dataset, the prediction of the 2014 average checkins were made based on the information up to the end of December 2013. For the prediction models, the Vector Auto-Regressive Moving Average (VARMA) and Support Vector Regression (SVR) were used as representative linear and nonlinear models, respectively. For features, the seven-dimensional features in FIG. 14 were used as the baseline, and the RCBM activation vectors in the first level (H1), the second level (H2), and in both levels (H1+H2). To gain further insights, another 1-level RCBM with an equal number of parameters as the two-level RCBM (i.e., with doubled number of filters) was used, and along with its activation vectors (H1$^2$) as features.

Figures 22, 23:
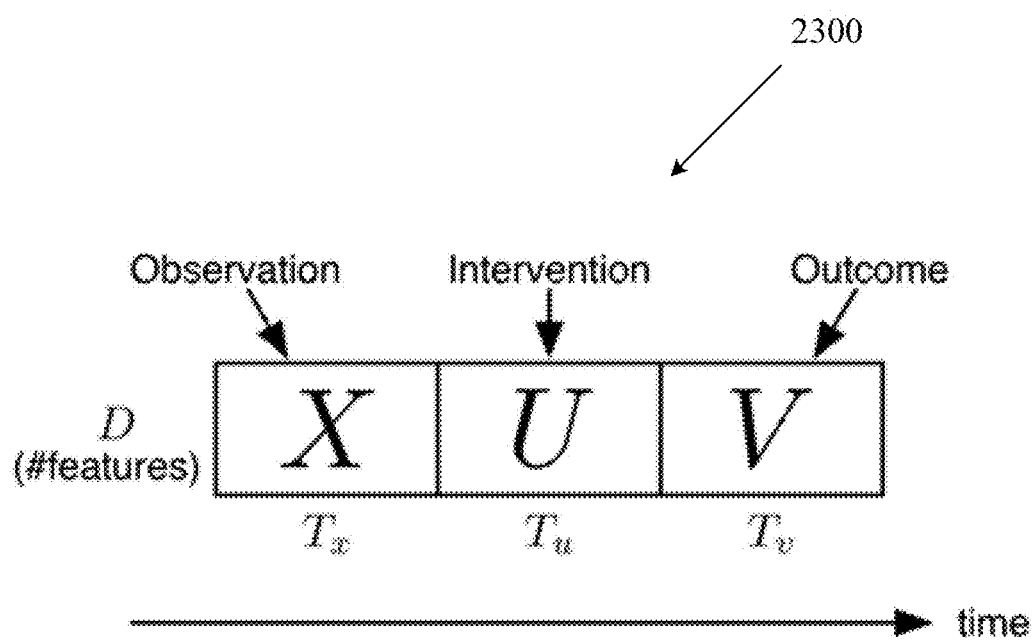
FIG. 22 is a table of forecasting error (via RMSE) of various models and features using the YELP® dataset.
FIG. 23 is a diagram representing a dynamic system in terms of observation dynamics, intervention dynamics, and outcome dynamics for modeling an dynamics engineering problem.

The results are summarized in the tables of FIGS. 21 and 22. In general, it is observed that SVR performed better than VARMA, whereas using the H1/H2/H1+H2/H1$^2$ features also performed much better than using the baseline features. However, an interesting observation is that using the setting VARMA+H1+H2 performed better than using the setting SVR+Baseline. This suggests that using activation vectors as features can perform reasonably well even when a simple linear model is used. Moreover, it can be observed that using H1+H2 performed much better than using H1, H2, or H1$^2$, no matter whether VARMA or SVR was used. This indicates that exploiting compositional features across different time scales using a multi-layer structure is indeed helpful in forecasting social dynamics.

Outcome-Dynamics Engineering

As mentioned above, some aspects of the present invention are directed to methods of engineering outcome dynamics of a dynamic system. As seen in FIG. 23 and referring to the table of FIG. 24, a dynamic system representation 2300 is shown as being partitioned into three parts, X, U, and V, wherein, X corresponds to observation dynamics of the dynamic system, Y corresponds to intervention dynamics applied to the dynamic system, and V corresponds to outcome dynamics of the dynamic system. The current time may be considered to be at the end of X, i.e., immediately prior to U. The input of the dynamics engineering problem corresponding to dynamic system is X, plus the knowledge of the historical dynamics behavior (e.g., a model). The output of the problem is the best (recommended) intervention dynamics U*, such that some properties of V is optimized. Ideally, it is also to obtain the projected outcome dynamics V*, i.e., as a result of U*.

Throughout this disclosure and in the appended claims, observation dynamics are represented as a D-dimensional time series $X \in R^{D \times T_x}$ that can characterize the propagation of any information token. As a running example, the dissemination of a TWITTER® hashtag can be characterized by the evolution of its three types (D=3) of users: "initiators" who bring in information from the outside world, "propagators" who forward the information as it is, and "commentators" who not only forward the information, but also provide their own comments about it. All notations used in this Outcome-Dynamics Engineering section and corresponding claims are listed in the table of FIG. 24.

Figure 25:
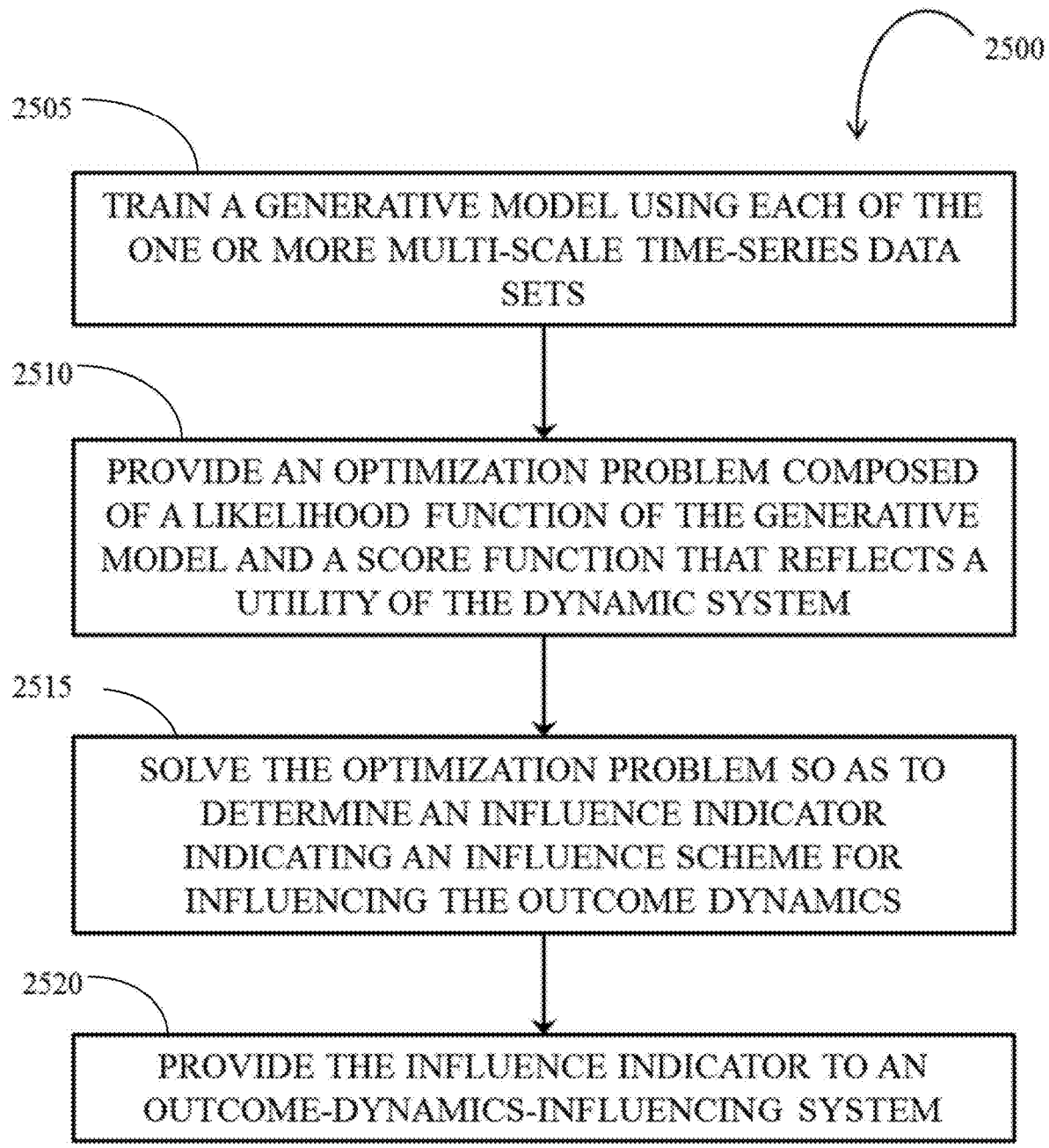
FIG. 25 is a flow diagram illustrating an exemplary method of engineering an outcome of a dynamic system.

FIG. 25 illustrates an exemplary computer-implemented method 2500 that can be used to engineer outcome dynamics of a dynamic system having one or more multi-scale time-series data streams. Examples of dynamic systems with which method 2500 can be used include, but are not limited to, social media platforms, such as the TWITTER®, SNAPCHAT®, FACEBOOK®, INSTAGRAM®, etc., social media platforms, combinations of two or more of such social media platforms, combinations of one or more of such social media platforms with one or more complementary multi-scale time-series data streams (e.g., a satellite video stream, a surveillance video stream, real-time human-movement sensor data, etc.), and any one or more of the foregoing dynamic systems with one or more informational non-time-series data stores, such as one or more image databases containing, for example, photographs of known criminals or other people or images of target items of interest, among other things. As those skilled in the art will readily appreciate, there is fundamentally no limitation on the character and nature of the dynamic system as long as an outcome-dynamics-engineering method can be applied to achieve suitable results.

Figure 26:
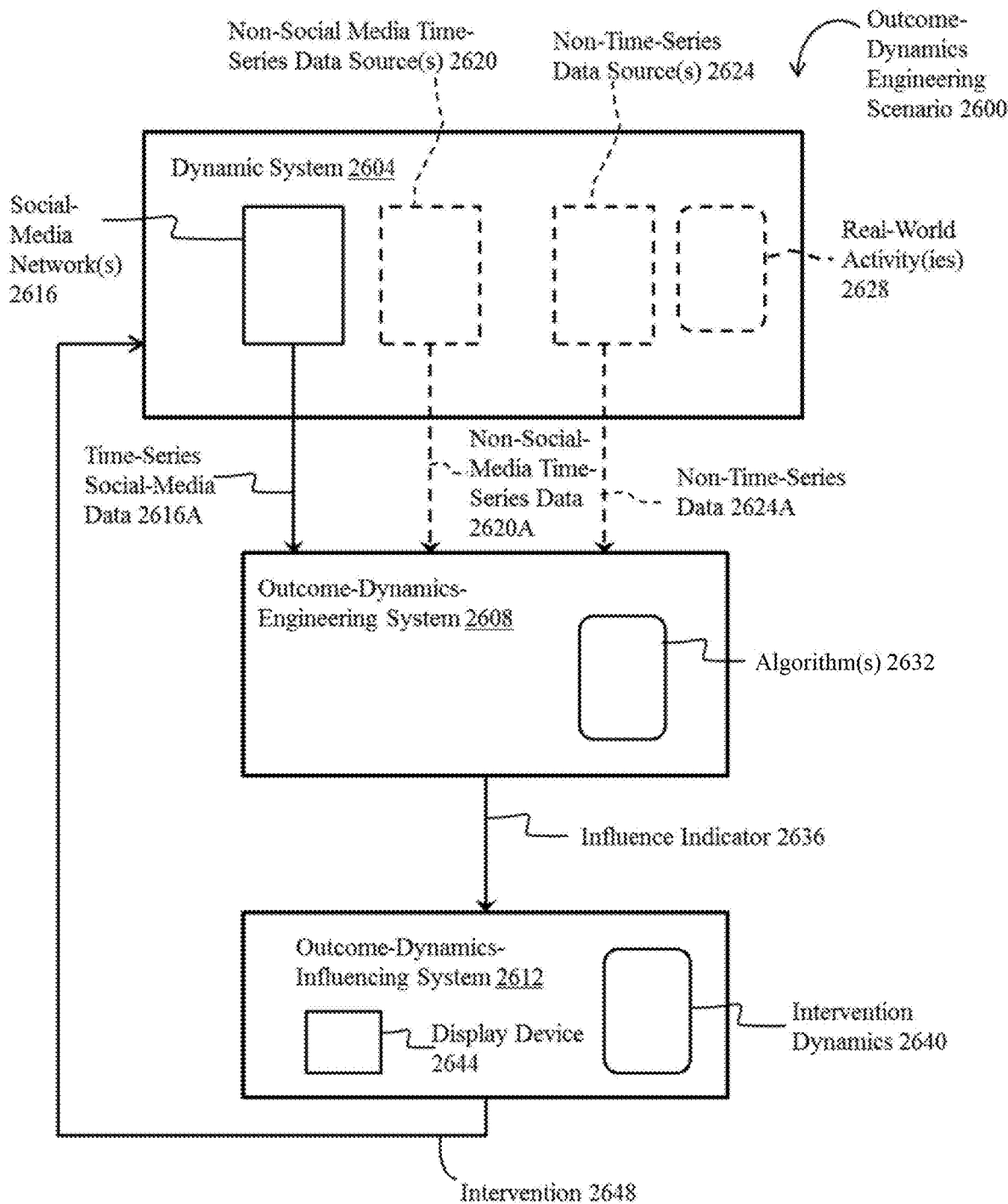
FIG. 26 is a high-level diagram illustrating an outcome-dynamics-engineering system executing the method of FIG. 25.

To aid in reader understanding of method 2500 of FIG. 25, FIG. 26 illustrates an exemplary outcome-dynamics-engineering scenario 2600 that includes a dynamic system 2604, an outcome-dynamics-engineering system 2608, and an outcome-dynamics-influencing system 2612. Depending on the nature of dynamic system 2604, a portion of it or all of it may be represented by dynamic system representation 2300 of FIG. 23. In this example, dynamic system 2604 includes at least one online social-media network 2616 that each have corresponding time-series social media data 2616A. Dynamic system 2604 may also include one or more of each of a non-social-media time-series data source 2620, such as a streaming video source, and a non-time-series data source 2624, such as an image database, that provide, respectively, non-social-media time-series data 2620A and non-time-series data 2624A. As an example of non-time-series data 2624A, in some embodiments the deep-learning generative model, such as RCBM, can be quite general and take in any type of multidimensional time-series input, images posted on a social-media platform can be transformed as one dimension of the social dynamics, and the transformation can be considered under two conditions, namely, one in which an image dictionary (i.e., non-time-series data) is available and another in which an image dictionary is not available.

When an image dictionary is available, it can comprise a collection of images of suspect items (e.g., guns, knives, etc.), indicia of suspect organizations (e.g., black flags), and photographs of people having criminal records. For example, a person having a criminal record may post tweets praising violence, and the tweet may contain a "selfie" (i.e., a photograph of that person taken by that person) and/or one or more tools for committing a crime. An image dictionary (again, non-time-series data) can be used to do a sparse representation for the posted images. The higher intensity, the more likely the posted images pose a threat to others. It is noted that occluded images (e.g., the person is wearing sunglasses making her eyes unseen) and corrupted images (e.g., poor quality (noisy) images) can be expressed as sparse linear combinations of images in the image dictionary, plus errors due to occlusion and corruption. If a posted image is not in the image dictionary, its sparse coding coefficients will be spread widely among multiple subjects in the image dictionary. If an image dictionary is not available, image recognition becomes more difficult, but it is still possible to identify objects. For example, using a suspect organization's black flag as an example, multiple images can be taken and averaged to obtain an obscure version of black flags (denoted as a prior image M), which is going to be low rank. Then, low rank approximation can be used to see if the tweeted image may be a black flag. These are but a few examples. Those skilled in the art will readily appreciate the wide variety of scenarios in which non-time-series data, such as non-time-series data 2624A, can be used for multidimensional pattern identification.

In some embodiments, dynamic system 2604 may also include one or more real-world social activities 2628, which can be virtually any activity in which at least one person interacts with one or more other people and/or influences one or more people by her/his actions. Examples of real-world social activities that the one or more real-world social activities 2628 can be are virtually limitless and include visiting a shopping mall or other venue, traveling by vehicle, participating in a parade, watching a sports match, etc., among many, many others. Reasons why dynamic system 2604 may optionally include one or more of each of non-social-media time-series data source 2620, non-time-series data source 2624, and real-world social activities 2628 will become apparent upon reading the rest of this description of outcome-dynamics-engineering scenario 2600.

Dynamic-engineering system 2608 includes one or more algorithms 2632 that perform at least method 2500 of FIG. 25. In this connection and referring to FIG. 25, at step 2505, algorithm(s) 2632 train(s) a generative (probabilistic) model using each of the one or more multi-scale time series data sets, such as time-series social media data 2616A and non-social-media time-series data 2620A from dynamic system 2604 of FIG. 26. An exemplary generative model based on RCBM is described below and also above. That said, and as indicated below, the disclosed RCBM is not the only generative model that algorithm(s) 2632 can implement at step 2505. Rather, algorithm(s) 2632 can use any suitable generative model.

At step 2510 (FIG. 25), algorithm(s) 2632 (FIG. 26) provide(s) an optimization problem composed of a likelihood function of the generative model of step 2505 and a score function that represents a utility of dynamic system 2604. An exemplary likelihood function and exemplary score functions suitable for use at step 2510 are described below in detail. That said, those skilled in the art will understand that a different likelihood function corresponding to another generative model may be used. Those skilled in the art will also understand that a score function other than the score functions explicitly described herein can be used, depending on the application of method 2500 at issue.

At step 2515 (FIG. 25), algorithm(s) 2632 (FIG. 26) solve(s) the optimization problem of step 2510 so as to determine an influence indicator 2636 (FIG. 26) that indicates intervention dynamics for influencing the outcome dynamics of dynamic system 2604. Depending on the application of method 2500 and the nature of dynamic-engineering-influencing system 2612, influence indicator 2636 may take any of a variety of forms. For example, in the context of a social-media marketing campaign, influence indicator 2636 provides an indication of the determined optimal intervention, such as a particular combination of marketing options (e.g., for TWITTER®, the number of tweeters, frequency of tweets, etc.). In the context of a threat-alert system, influence indicator 2636 may be, for example, an indication to increase security personnel at a suspected location of the threat or simply a threat level or probability. The particular manner by which algorithm(s) 2632 solves the optimization problem at step 2515 will depend on a number of factors, such as the generative model used and the solution techniques available for the optimization problem. Exemplary solution techniques for the RCBM-based optimization problem disclosed herein are described in detail below, and algorithm(s) 2632 may be configured to utilize those solution techniques and/or portions thereof as applicable to the particular optimization problem at issue.

At step 2520 (FIG. 25), output-dynamics-engineering system 2608 (FIG. 26) provides influence indicator 2636 to outcome-dynamics-influencing system 2612. Depending, among other things, on the application of method 2500 (FIG. 25) and the nature of outcome-dynamics-engineering scenario 2600 (FIG. 26), outcome-dynamics-influencing system 2612 may be any of a wide variety of "systems" that apply determined intervention dynamics 2640 to dynamic system 2604 to engineer outcome dynamics of the dynamic system. For example, in the context of a social-media marketing campaign, outcome-dynamics-influencing system 2612 (FIG. 26) may, at one end of the spectrum, include a computer monitor or other output device 2644 that displays the influence indicator 2636 (e.g., a list of the combination of marketing options) or may, closer to the other end of the spectrum, provide an explicit set of instructions distributed automatically to pre-arranged participants in response to receiving the influence indicator. In the context of a threat-alert system, outcome-dynamics-influencing system 2612 may likewise simply include a computer monitor or other display device, such as device 2644, that displays a threat level to a human security officer in response to receiving influence indicator 2636. Alternatively in this example, outcome-dynamics-influencing system 2612 may be more sophisticated and programmed to, in response to receiving influence indicator 2636, determine available security resources (e.g., based on time of the threat and locations of the resources) and send messages to the available resources to deploy them to the suspected threat location. Those skilled in the art will readily appreciate the wide variety of configurations that outcome-dynamics-influencing system 2612 may take, with the configuration being a function of the application of method 2500 (FIG. 25) and the amount of automation desired to be built into the intervention process.

An output of outcome-dynamics-influencing system 2612 (FIG. 26) is an intervention 2648 that is applied to dynamic system 2604 for the purpose of influencing, or engineering, outcome dynamics of the dynamic system. Depending, among other things, on the application of method 2500 (FIG. 25), the nature of dynamic system (FIG. 26), and the configuration of outcome-influencing-system 2612, intervention 2648 may be any one or more of a wide variety of interventions. For example, in the context of a social-media marketing campaign on the TWITTER® platform, intervention 2648 may be specially tailored and specially timed tweets, retweets, etc., from a predetermined number of tweeters. As another example, in the context of a safety-alert system, intervention 2648 may be the timely deployment of one or more safety resources, such as police, security guards, etc., to a suspected location of a suspected safety threat. Those skilled in the art will readily understand that there is such a wide variety of possible interventions and underlying variations of outcome-dynamics engineering system scenario 2600 that it is impractical to list them. However, those skilled in the art will readily be able to implement them using the basic framework disclosed herein.

As noted above, methodologies disclosed herein can be used for applications having non-social-medial data sets. Two particular examples of other applications are human behavior modeling and macroeconomics pattern mining, which are described in detail in sections 6.1 and 6.2, respectively, in Huan-Kai Peng, "Understanding and Engineering Social Dynamics" PhD diss. Carnegie Mellon University, Pittsburgh, Jan. 31, 2016, which is incorporated herein by reference for these specific examples and related descriptions. Other exemplary applications include improving movement prototype mining, activity recognition, and anomaly detection when applied to sensor-based human behavior modeling. The inventors have also shown that the methodologies disclosed herein can be used to identify some meaningful macroeconomics patterns that may affect the GDP growth.

As those skilled in the art will readily appreciate, outcome-dynamics-engineering scenario 2600 (FIG. 26) may take place using a network of computing systems, for example, the Internet, in which each of the computing devices may take any suitable form, such as a web server or other server, a mobile computing device, and a desktop computing device, among others. For the sake of completeness, FIG. 35 discloses a generic computing system 3500 that may be representative of any of the computing systems participating in outcome-dynamics-engineering scenario 2600.

Exemplary Dynamics-Engineering Problem

The present inventors have determined that the dynamics-engineering problem described above relative to FIG. 23 can be solved efficiently utilizing an appropriate probabilistic, or generative, model and a score function.

Score Function. To define the dynamics engineering problem formally, let $Y=[UV] \in R^{D \times (T_u+T_v)}$ denote the concatenation of the two matrices U and V. For example, if $$U = \begin{bmatrix} 1 & 2 \\ 3 & 4 \end{bmatrix} \text{ and } V = \begin{bmatrix} 5 & 6 \\ 7 & 8 \end{bmatrix}, \text{ then } Y = \begin{bmatrix} 1 & 2 & 5 & 6 \\ 3 & 4 & 7 & 8 \end{bmatrix}.$$

Note that this concatenation is merely for mathematical convenience: U and V still differ in their meanings and in the kinds of properties their corresponding solutions (U* and V*) are desired to satisfy.

Moreover, let y=vec(Y) denote its vectorization (i.e., its transformation into a column vector):

$$y = vec(Y) = vec\left(\begin{bmatrix} -y_1^T - \\ \vdots \\ -y_D^T - \end{bmatrix}\right) = \begin{bmatrix} y_1 \\ \vdots \\ y_D \end{bmatrix}. \quad (13)$$

Using the same example above, we have $$vec\left(\begin{bmatrix} 1 & 2 & 5 & 6 \\ 3 & 4 & 7 & 8 \end{bmatrix}\right) = [12345678]^T.$$

Accordingly, the engineering problem can be reformulated as maximizing a score function defined as:

$$score(y) = y^T By + d^T y. \quad (14)$$

wherein B and d define the quadratic and linear parts of the score function, respectively. It is noted that this quadratic score function is general, in the sense that different goals can be achieved using various special cases.

Formal Dynamics-Engineering Problem. While maximizing the score function, two implicit assumptions are made: (1) there exists a temporal dependency among X and Y=[U V], and (2) the solution we come up with needs to follow that dependency. Using notation in the table of FIG. 24, given observation X, a probabilistic model P(·), and a score function, an exemplary dynamics-engineering problem is to find:

$$Y^* = [U^* \ V^*] = \underset{Y}{\operatorname{argmax}} \log P(Y \mid X) + \lambda \operatorname{score}(Y). \quad (15)$$

Herein, P(·) denotes the log-likelihood using a probabilistic model that captures the temporal dependencies of the social dynamics. In other words, while the second term (i.e., the score function) takes care of the specific engineering task, the first term (i.e., log P(Y|X)) makes sure that the solution still conforms with the temporal dependency of the social dynamics. Moreover, $\lambda \geq 0$ is a balancing parameter that controls the relative importance of fitting the probability distribution P(·) versus maximizing the score. Of note, the selection of $\lambda$ is important and is described below. It is noted that this proposed problem definition is general yet precise. Indeed, it can incorporate any combination of P(·) and score(Y) functions, in which any different combination corresponds to a different engineering task. Also, once this combination is given, the engineering problem is mathematically precise.

Exemplary Probabilistic Model

In principle, any probabilistic model of social dynamics can be plugged into the likelihood term P(·) in Equation 15, above. However, the present inventors have found that a particular probabilistic model, namely the RCBM described above relative to pattern identification, is particularly effective.

According to RCBM, the basic generation process for dynamics X is:

$$P(h; \beta) = \frac{1}{\beta} \exp\left(\frac{\sum_k \|h_k\|_1}{-\beta}\right) \quad (16)$$

$$P(X \mid h; W, \sigma) = \frac{\sqrt{2}}{\sigma\sqrt{\pi}} \exp\left(\frac{\left\|X - \sum_k W_k \otimes h_k\right\|_F^2}{-2\sigma^2}\right),$$

More specifically, RCBM assumes that dynamics X (or more generally, the concatenation of [X U V]) are generated from making "scaled copies" of the filter matrices $W_k$'s, where the time shift and the scaling of these copies are determined by the sparse activation vectors $h_k$'s. Such a "scale-and-copy" operation is carried out using the operator ⊗ in Equation 16, above, which denotes a dimension-wise convolution defined as:

$$(W \otimes h)[d, t] = \sum_{s=1}^{T_w} h[t + T_w - s] \cdot W[d, s] \forall d, t. \quad (17)$$

It is noted that this operator differs from the conventional matrix convolution. Effectively, ⊗ does D 1-D convolutions between each row of W and the entire h, and puts back the results to each row of the output matrix separately.

By stacking multiple levels of the basic form in Equation 16, a deep-learning architecture is constructed:

$$P(X, h) = \prod_l P(X_l | h_l; W_l, \sigma_l) P(h_l; \beta_l) \quad (18)$$

$$= \frac{1}{Z} \exp\left( \sum_l \frac{\left\| X_l - \sum_k W_{l,k} \otimes h_{l,k} \right\|_F^2}{-2\sigma_l^2} + \frac{\sum_k \|k_{l,k}\|_1}{-\beta_l} \right).$$

A key of this construction is building the upper-level dynamics $X_l$ by max-pooling the lower-level activation vectors $h_{l-1,k}$. This essentially takes the maximum value over c consecutive values of the lower-level activation vectors. This operation introduces non-linearity into the model, which is key for the superior performance of deep-learning methods.

Exemplary Score Functions

Pattern matching: To achieve an ideal outcome $V_{ref}$ while minimizing the cost associated with the required intervention U, one can maximize the following score function:

$$score_{match}(Y) = -(1-\rho)\|V - V_{ref}\|_f^2 - \rho\langle C_{cost}, U\rangle \quad (19)$$

$$= y^T B y + d^T y.$$

The first term denotes mismatch and will force V to match $V_{ref}$; the second term denotes cost and will typically force values in U to be small. Here $\rho \varepsilon [0, 1]$ controls the relative importance of mismatch versus cost. Moreover, $C_{cost}$ encodes the relative expense of controlling different features at different times, whereas $\langle U, C \rangle = \Sigma_{ij} U_{ij} C_{ij}$ denotes the dot product between U and C. For example, suppose $$C_{cost} = \begin{bmatrix} 1 & 1 \\ 2 & 2 \end{bmatrix} \text{ and } U = \begin{bmatrix} 1 & 2 \\ 3 & 4 \end{bmatrix},$$

then $\langle C_{cost}, U \rangle = 1\times1 + 1\times2 + 2\times3 + 2\times4 = 17$. Returning to the TWITTER® example above, suppose that the first row of $$U = \begin{bmatrix} 1 & 2 \\ 3 & 4 \end{bmatrix}$$

represents the numbers of propagators (i.e., one propagator at t=1 and two propagators at t=2) and that the second row represents the numbers of commentators (i.e., three commentators at t=1 and four at t=2), then assigning $$C_{cost} = \begin{bmatrix} 1 & 1 \\ 2 & 2 \end{bmatrix}$$

is equivalent to specifying that it is twice as expensive to grow the number of commentators (TWITTER® users who spend time to leave comments) than to control the number of propagators (who simply click "retweet"), regardless of time. Finally, we note that Equation 19 is a special case of Equation 14. To check this, the second line of Equation 19 can be rewritten using $B=(1-\rho)\hat{I}_v^T \hat{I}_v$, $d=\text{vec}([-\rho C_u 2(1-\rho) V_{ref}])$, and $\hat{I}_v = I_D \otimes ([0_{T_v \times T_u} \; I_{T_v}])$. Herein $\otimes$ denotes the Kronecker product (see the table of FIG. 24 for a summary of notations).

Profit maximization: To maximize the reward associated with the outcome V while minimizing the cost associated with the intervention U, one can maximize the following score function:

$$score_{profit}(Y) = -\rho\langle C_{cost}, U\rangle + (1-\rho)\langle C_{reward}, V\rangle \quad (20)$$

$$= d^T y,$$

The first term denotes cost and will typically force the values in U to be small; the second term denotes reward and will typically force the values in V to be large. Similarly to the above task, $C_{cost}$ is used to encode the relative cost and use $C_{reward}$ to encode the relative reward of different dimensions and time. Following the above TWITTER® example, assigning $$C_{reward} = \begin{bmatrix} 1 & 3 \\ 1 & 3 \end{bmatrix}$$

is equivalent to specifying that it is three times more rewarding to acquire a user (either a propagator or a commentator) at t=2 compared to acquiring a user at t=1, regardless of the type of the user. Like the case of Equation 19, $\rho$ controls the relative importance of cost versus reward. It is noted that Equation 20 is another special case of Equation 14. To check this, the second line of Equation 20 can be rewritten using $d=\text{vec}([-\rho C_{cost}(1-p)C_{reward}])$.

RCBM Formulation of Exemplary Dynamics-Engineering Problem

By writing down the conditional probability P(Y|X) using the joint probability specified in Equation 18 and then plugging P(Y|X) into the first term of Equation 15, the optimization problem in Equation 15 can be explicitly written as:

$$\operatorname*{argmin}_{Y, h_1, h_2, S} \frac{1}{2} \left\| [XY] - \sum_k W_{1k} \otimes h_{1k} \right\|_F^2 + \frac{\sigma_1^2}{\beta_1} \sum_{k=1}^{K_1} \|h_{1k}\|_1 + \quad (21)$$

$$\frac{1}{2} \left\| MP(h_1) - \sum_k W_{2h} \otimes h_{2k} \right\|_F^2 + \frac{\sigma_2^2}{\beta_2} \sum_{k=1}^{K_2} \|h_{2k}\|_1 - \lambda(y^T B y - d^T y)$$

s.t. $h_{1k} \geq 0, h_{2k} \geq 0$ and $y \geq 0$.

Here, a two-level RCBM is presented for illustration purposes, though the optimization formulation for a multilevel RCBM can be similarly derived. The max-pooling operation $MP(\cdot)$ is defined as:

$$MP(h_1)[k, t] = \max_{i \in 1, \ldots, c} h_{1k}[(t-1)c + i], \quad (22)$$

wherein $h_1$ is the vector concatenation of $\{h_{ik}\}_{k=1}^{K_i}$. As mentioned above, $MP(\cdot)$ is a key that enables RCBM (or more generally, any convolutional deep-learning method) to learn the nonlinear features of the series. However, it also imposes significant difficulties in optimization by making the problem non-differentiable and non-convex. Consequently, the problem in Equation 21 is not only difficult to solve, but also prone to getting stuck at suboptimal solutions.

Exemplary Solution of RCBM Formulation

To solve the difficulty resulting from max-pooling, the following convex relaxation may be used:

$$\operatorname*{argmin}_{Y,h_1,h_2,S} \frac{1}{2} \left\| [XY] - \sum_k W_{1k} \otimes h_{1k} \right\|_F^2 + \frac{\sigma_1^2}{\beta_1} \sum_{k=1}^{K_1} \|h_{1k}\|_1 + \quad (23)$$

$$\frac{1}{2} \left\| S - \sum_k W_{2k} \otimes h_{2k} \right\|_F^2 + \frac{\sigma_2^2}{\beta_2} \sum_{k=1}^{K_2} \|h_{2k}\|_1 - \lambda(y^T B y + d^T y)$$

s.t. $h_{1k} \geq 0, h_{2k} \geq 0$ and $Y \geq 0$, $h_{1k}[(t-1)c + i] \leq S[k,t]$ $S[k,t] \leq \sum_{i=1}^{c} h_{1k}[(t-1)c + i]$.

The idea behind this relaxation consists of introducing a new variable S as the surrogate of MP(·). Furthermore, the equality constraints specified in Equation 22 may be substituted with two sets of inequality constraints, i.e., $$\max_{i \in 1, \ldots, c} h_{1k}[(t-1)c + i] \leq S[k,t] \leq \sum_{i=1}^{c} h_{1k}[(t-1)c + i].$$

In other words, instead of forcing S to equate $$S[k,t] = \max_{i \in 1, \ldots, c} h_{1k}[(t-1)c + i],$$

i.e., the maximal value among the consecutive c values, we now constrain it to be larger than or equal to the maximal value, but smaller than or equal to the sum of those c values.

It is noted that the problem in Equation 23 is now jointly convex in Y, $h_1$, $h_2$ and S, since the objective function is convex and all constraints are linear. Moreover, since the objective is differentiable, a possible approach to solve Equation 23 is using the proximal method. It turns out, however, that the projection functions corresponding to the constraints in Equation 23, which are required in the proximal method, are difficult to derive.

The issue may be solved by noting that the objective function of Equation 23 is quadratic with only linear constraints. Therefore, in principle, there exists a quadratic programming (QP) transformation that is equivalent to Equation 23. The explicit form and the mathematical details of this QP transformation is described in the S1 Appendix of Peng et al., "Data-Driven Engineering of Social Dynamics: Pattern Matching and Profit Maximization," http://dx.doi.org/10.1371/journal.pone.0146490, PLOS, (Jan. 15, 2016) that is incorporated herein by reference. It is noted that, since the problem is jointly convex, QP is guaranteed to find an approximate solution in polynomial time. In our experiments, the QP has around 1000 variables and the problem gets solved in just a few seconds.

Data-Driven Evaluation

For many methods in modeling and prediction, cross-validation is a standard way for evaluating solutions and selecting parameters. However, cross-validation cannot be directly applied to the current dynamics engineering problem, because the properties of a "good solution" for modeling and prediction is well-known. For example, a good modeling solution will have high data likelihood and a good prediction solution will be highly accurate. For the current dynamics-engineering problem, however, such a property is less obvious.

For the current dynamics engineering problem, it is asserted that a key property of a good solution may consist of combining a high score and a high validity, where the latter can be roughly defined as how well the solution is supported by historical samples that achieve high scores. To show that having a high score alone is not sufficient, consider the case when $\lambda \to \infty$ in Equation 15. In this case, the optimization will produce the highest possible score, while completely ignoring the likelihood term in Equation 15. As a result, the optimization will produce a solution that does not possess any inherent temporal dependency of the data. In this case, the projected outcome V* would be unlikely to happen in the real world even if the suggested intervention U* is implemented.

Validity. As mentioned above, the informal definition of validity is how well the solution is supported by historical samples that achieve high scores. To formally define validity $\gamma$, two important components are: (1) $\hat{P}$ that denotes the density function capturing what the high-scoring dynamics look like in historical data, and (2) $q_0$ that denotes a carefully chosen threshold. More precisely, $\hat{P}(\cdot)$ and $q_0$ may be constructed in four steps:

1. Evaluate the value of the score function using all historical samples $\{[X_i, Y_i]\}_{i=1}^{N}$, rank them according to their evaluated values, and then keep only the $N_0$ top-scoring samples.

2. Use the first half $$\{[X_i, Y_i]\}_{i=1}^{\lfloor \frac{N_0}{2} \rfloor}$$

to construct a kernel density estimator:

$$\hat{P}(X, Y; h) \propto \sum_i \exp \frac{\|[X, Y] - [X_i, Y_i]\|^2}{-2\omega^2}.$$

3. Use the second half $$\{[X_i, Y_i]\}_{i=\lfloor \frac{N_0}{2} \rfloor + 1}^{N_0}$$

to choose the value of ω that has the highest data likelihood.

4. Use the second half to calculate $q_0$, such that only a small fraction (e.g., 5%) of samples among the second half has $\hat{P}(X, Y; h) < q_0$.

With $\hat{P}(\cdot)$ and $q_0$ defined, we can define the validity $\gamma$ corresponding to a solution $Y^*(\lambda)$ (i.e., solution of Equation 15 using a specific value of $\lambda$) as:

$$\gamma(\lambda) = \log \frac{\hat{P}([X, Y^*(\lambda)])}{q_0}. \quad (24)$$

Then, γ can be used as a convenient measure, such that γ≥0 indicates that, according to historical high-scoring data, the solution is "realistic enough."

A main idea behind the above procedure is to construct $\hat{P}(X, Y)$ as a density estimator of the high-scoring historical samples, and then construct $q_0$ as the quantile estimator (e.g., at 5%) for the empirical distribution of $\{P_i\}_i$. Here $\hat{P}_i = \hat{P}(X_i, Y_i)$ denotes the value of $\hat{P}(\cdot)$ evaluated using $X_i$ and $Y_i$. Therefore, when the density of a solution $\hat{P}([X, Y^*(\lambda)])$ is larger than $q_0$ (i.e., when γ≥0 in Equation 24), we call this solution as being "realistic enough," because it is more likely (i.e., more realistic) than the 5% most-unlikely high-scoring historical samples.

It is noted that in the construction of γ, and in particular, $\hat{P}(\cdot)$ and $q_0$, the entire training set is not used. The underlying reason is that a realistically good solution can be very rare. In other words, it is by design that validity should measure how well a solution is supported by historical samples that achieve high scores, instead of historical samples in general. Consequently, in principle, $N_0$ should be selected as a small fraction (e.g., 10%) of the size of the historical samples.

It is also noted that $\hat{P}(X, Y)$ and $q_0$ depend on the partitioning in the second and third steps, which, according to Equation 24, can also affect γ(λ). A simple way to remove such a dependency is to use multiple random partitionings, obtain the corresponding copies of $\hat{P}(X, Y)$'s and $q_0$'s, and then calculate the average value of Equation 24 using all these copies.

Selection of λ. With validity defined, λ may be selected. As mentioned above, λ should be the combination of high validity and high score. A key observation from Equation 15 is that one can make the score larger by making λ larger. Therefore, while there may be many potential ways to do it, we propose the following method:

$$\underset{\lambda}{\mathrm{argmax}}\, \lambda \quad (25)$$
$$\text{s.t. } \gamma(\lambda) \geq 0,$$

where the idea is that conditioned on the solution being (sufficiently) valid, its score is desired to be as high as possible. A TWITTER® dataset is used to demonstrate the interplay among λ, validity (γ), and score while engineering social dynamics in the next section.

Experimental Results for RCBM-Based Outcome Dynamics Engineering

For experimental results, the dataset, the overall setup, and two baseline methods are first described. Then, experimental results are presented on two engineering tasks: pattern matching and profit maximization.

Dataset Description

The dataset used in the experiments was a TWITTER® dataset that consisted of 181M postings from 40.1M users and 1.4 B following relationships. With this dataset, hashtags were used to enumerate the information tokens that carry social dynamics. "Low-traffic" hashtags were filtered-out by selecting only the ones with at least 100 total usages around the 90 minutes during their peak times, yielding a 10K-sample dataset of social dynamics. These samples were then sorted according to their peak time. The first 9K samples were used as the training set, i.e., for model training and the construction of $\hat{P}(\cdot)$ and $q_0$ (mentioned above), whereas the remaining 1K samples were reserved for testing. This data partitioning scenario ensured that all training data occurs prior to testing data, i.e., no "future data" was used while testing. For all hashtag samples, the dynamics were measured in units of 3 minutes, where the first 30 minutes were the observation dynamics (X), the middle 30 minutes were the intervention dynamics (U), and the last 30 minutes were the outcome dynamics (V).

Each social dynamic was characterized using its five types of users. "Initiators" denote the users who used this keyword before any of his or her friends did. "First-time propagators" and "first-time commentators" denote the users who retweeted and tweeted, respectively, about this keyword after his or her friends using the same keyword before. "Recurring propagators" and "recurring commentators" denote the users who retweeted and tweeted, respectively, the same keyword that they themselves used before. Of note, it means that X, U, V∈$R^{5 \times 10}$ because now each variable has five features and ten timesteps (i.e., three minutes per timestep).

Setup

Experiments were conducted on two types of engineering tasks, namely, by solving Equation 15 using two distinct score functions: the one in Equation 19 for pattern matching and the one in Equation 20 for profit maximization. For pattern matching, we set $C_{cost} = 1_{D \times Tu}$ in Equation 19 to assume a uniform intervention cost in time and for different types of users. Similarly, for profit maximization, $C_{cost} = 1_{D \times Tu}$ and $C_{reward} = 1_{D \times Tv}$ in Equation 20 were set. Of note, the assignment of $V_{ref}$ in Equation 19 depends on the particular experiment and is detailed below.

In order to analyze the interplay and tradeoffs critical to real-world engineering applications, for each task, analyses were conducted along the following four directions:
1. Interplay between validity γ (Equation 24) and the optimization parameter λ (Equation 15).
2. Tradeoff of individual terms in the score functions. In particular, for pattern matching (Equation 19), it includes cost ($<C_{cost}, U>$) and mismatch ($\|V-V_{ref}\|_f^2$); for profit maximization (Equation 20), it includes cost ($<C_{cost}, U>$) and reward ($<C_{reward}, V>$).
3. Comparison between "real" vs. engineered cases. A motivation behind this analysis is to quantify the potential benefits as a result of purposeful engineering, compared to what happened in reality.
4. A case study.

Baseline Methods

AR. A first baseline is to substitute the likelihood term in Equation 15 with another one using the Autoregressive model (AR). AR is commonly used in time-series forecasting and is defined as:

$$x_t = \sum_{i=1}^{p} \Phi_i x_{t-i} + \epsilon_t \quad (14)$$

Here $x_t \in R^{D \times 1}$ denotes the multivariate features at time t; $\epsilon_t \sim \mathcal{N}(0, \Sigma)$ denotes the independent and identically distributed multivariate Gaussian noise; $\Phi_i$'s denote the matrices for modeling the dependency between the current dynamics and its history back to p steps, where we set p=10. Details of solving Equation 15 with the first term using AR is given in the S1 Appendix noted and incorporated herein by reference above. While this baseline fits perfectly in our proposed framework, its restrictive linear generative model may limit its performance.

NN. A second baseline is based on a nearest-neighbor (NN) search. The idea is to search within the training data for the top 5% samples that are the most similar to the given observation X (using Euclidean distance). Then the solution Y* is obtained using the {U, V} part of the highest-scoring sample within that subset. The advantage of NN is that, unlike other methods, it doesn't have a concern about validity, i.e., whether the solution is realistic or not, because the solution is generated from real dynamics that happened in the past. However, its disadvantage is that not all historical dynamics matches the observation X and maximizes the score function at the same time. Consequently, the score of an NN solution may be low or unstable.

Experiment 1: Pattern Matching

In a first experiment, i.e., pattern matching, the observation $X_i$ of every test sample was given and the aim was at matching a single $V_{ref}$. This $V_{ref}$ is defined as the average outcome dynamics of the top 2% samples in the training set with the highest long-term popularity $\|V\|_1$. Dynamics engineering was conducted using all test samples and the resulting validity, cost, and mismatch were analyzed.

Figure 27:
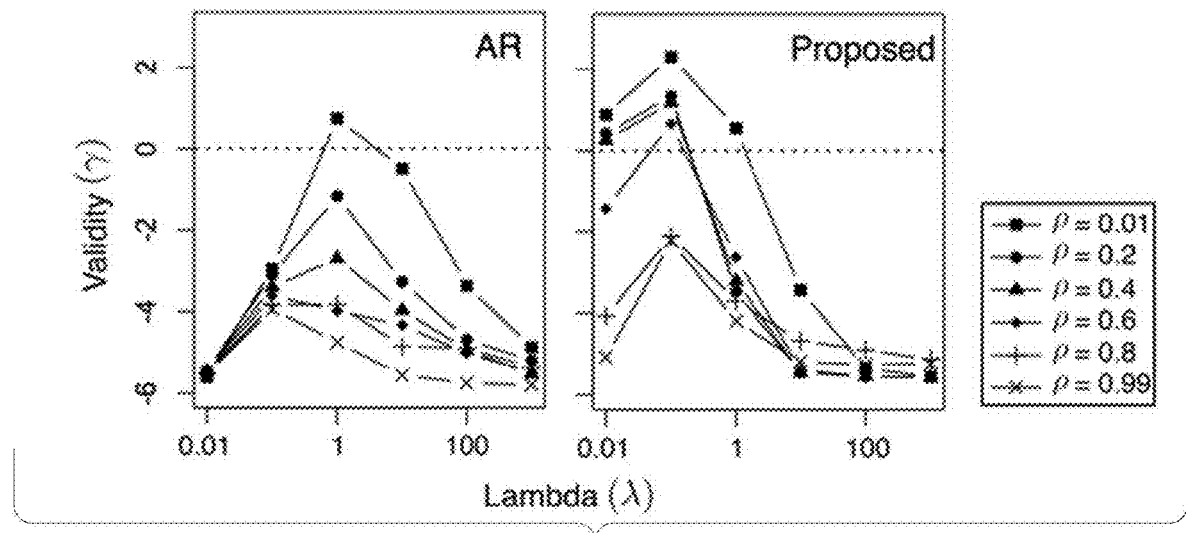
FIG. 27 contains graphs illustrating the influence of $\lambda$ on solution validity $\gamma$ using different values of $\rho$, wherein the dotted lines mark $\lambda \geq 0$, above which the solution is considered valid.

Validity ($\gamma$) vs. $\lambda$. In FIG. 27, the effect of different values of $\lambda$ on the average solution validity $\gamma$ is analyzed. The dotted horizontal lines marks $\gamma=0$, above which the solution is considered valid. Note that NN is not included here since it doesn't require the selection of $\lambda$. From the figure, the observations are twofold. First, there is indeed a range of $\lambda$ that produces valid solutions. In particular, that range changes with the value of $\rho$: the lower $\rho$ is, the larger the range is. This is because a lower $\rho$ puts more emphasis on minimizing mismatch instead of cost (see Equation 19). While there is nothing unrealistic about the pattern that needs to be matched, matching it using an extremely low cost (i.e., using a large $\rho$) can be unrealistic. Second, the current method outperforms the AR baseline in terms of validity, since the results using the current method have a lot more cases above the dotted line (indicating $\gamma \geq 0$) compared to AR. This is because the current method incorporates RCBM that can effectively capture non-linear features, whereas AR is a linear model.

Figure 28:
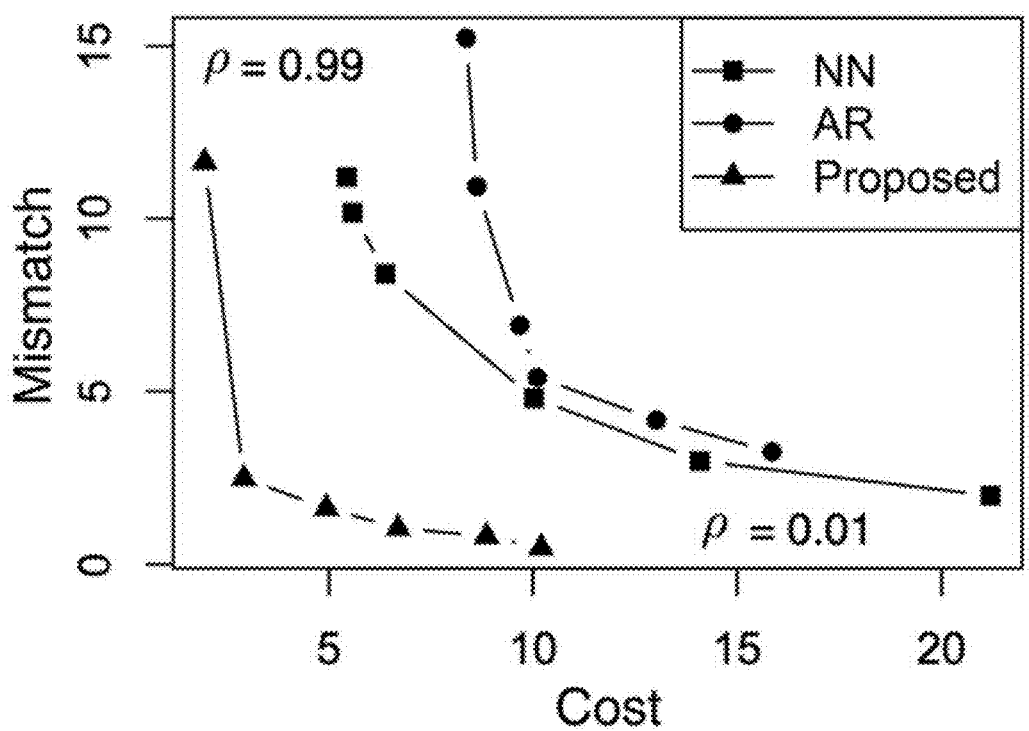
FIG. 28 is a graph illustrating tradeoff between cost and mismatch using different values of $\rho$.

Cost-Mismatch Tradeoff. In FIG. 28, the tradeoff of using different values of $\rho$ is analyzed, wherein $\lambda$ is selected using Equation 25. In cases when there is no $\lambda$ that satisfies $\gamma(\lambda) \geq 0$, we select $\arg\max_\lambda \gamma(\lambda)$ instead. The results of average cost versus mismatch using all three methods are summarized in FIG. 28. For each method, the point in the lower-right corner corresponds to the case of $\rho=0.01$, whereas the point in the upper-left corresponds to the case of $\rho=0.99$. From FIG. 28, the current method consistently makes the best tradeoff: with the same mismatch, it achieves a lower cost; with the same cost, it achieves the lower mismatch. The reason for this is twofold: for AR, its linear model is too restrictive to reach either of the two objectives; for NN, the samples in the subset of training data that matches the given observation do not necessarily have a high score. Another interesting observation is that NN seems to make better tradeoffs compared to AR. This shows that the selection of a good generative model is crucial for dynamics engineering.

Constrained Cost Minimization. In order to demonstrate the potential benefits of purposeful engineering, a slightly different setting was used. While for each test sample i, the observation part $X_i$ was still given, we set $V_{ref}=V^i$, i.e, its own outcome dynamics. This setting allowed us to compare the performance of the matching algorithms, in terms of cost, with what actually happened in reality, assuming that each test sample was actually performing a (perfect) matching task without consciously considering minimizing the cost.

Since the real case achieves a "perfect match," the engineering algorithms needed to be constrained such that they can be compared on the same footing. Therefore, an additional constraint $\|V^*-V_{ref}\|_1 \leq pDT_v$, wherein p=5%, was enforced. In other words, after going through every test sample, each algorithm had its own fraction of valid answers, and only the valid answers were compared to the same set of samples, in terms of cost, to the real case. For AR and the current method, a valid answer needed to satisfy this constraint on top of satisfying $\gamma \geq 0$.

Figure 29:
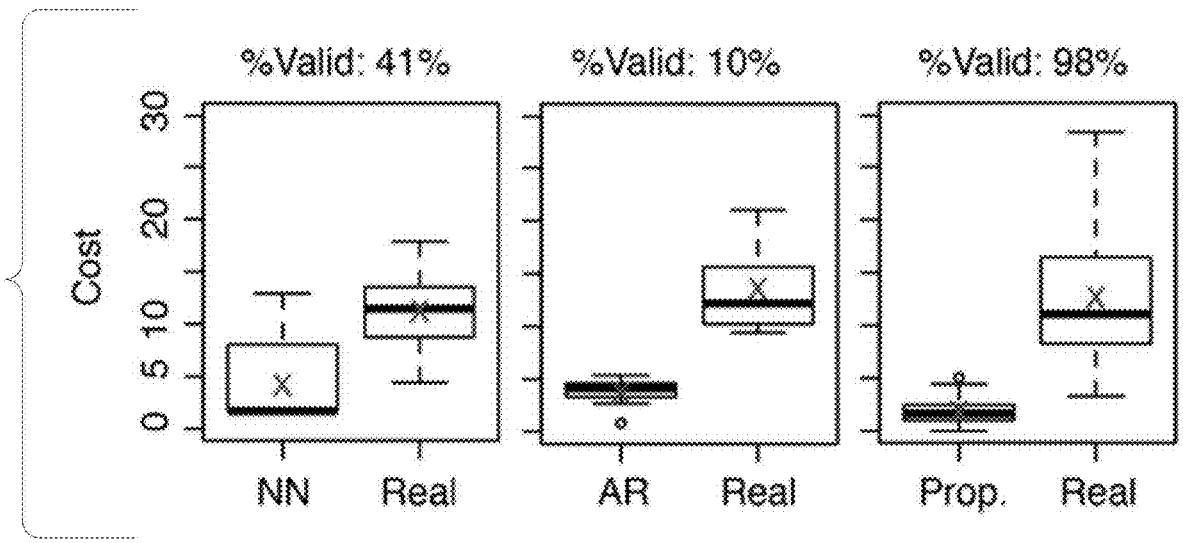
FIG. 29 contains graphs illustrating cost distribution of valid answers using different methods.

FIG. 29 summarizes the results where the fraction of valid answers are annotated at the top and the mean values are marked using crosses. From FIG. 29, it is noted that NN produced valid answers for 41% of the test samples, whereas the number was 10% for AR and 98% for the current method. Also, the mean cost among the valid solutions using NN was 4.34, compared to 4.82 for AR and 2.31 for the current method. In other words, the current method achieved not only the largest fraction of valid solutions, but also the lowest average cost for that larger fraction. Note that the cost produced by NN had a high variation. Finally, they all achieved a lower cost than the corresponding samples in the real case, which is somewhat expected because the real cases were not consciously minimizing the cost. This further highlights the cost-saving potential of these dynamics-engineering methods.

Figure 30:
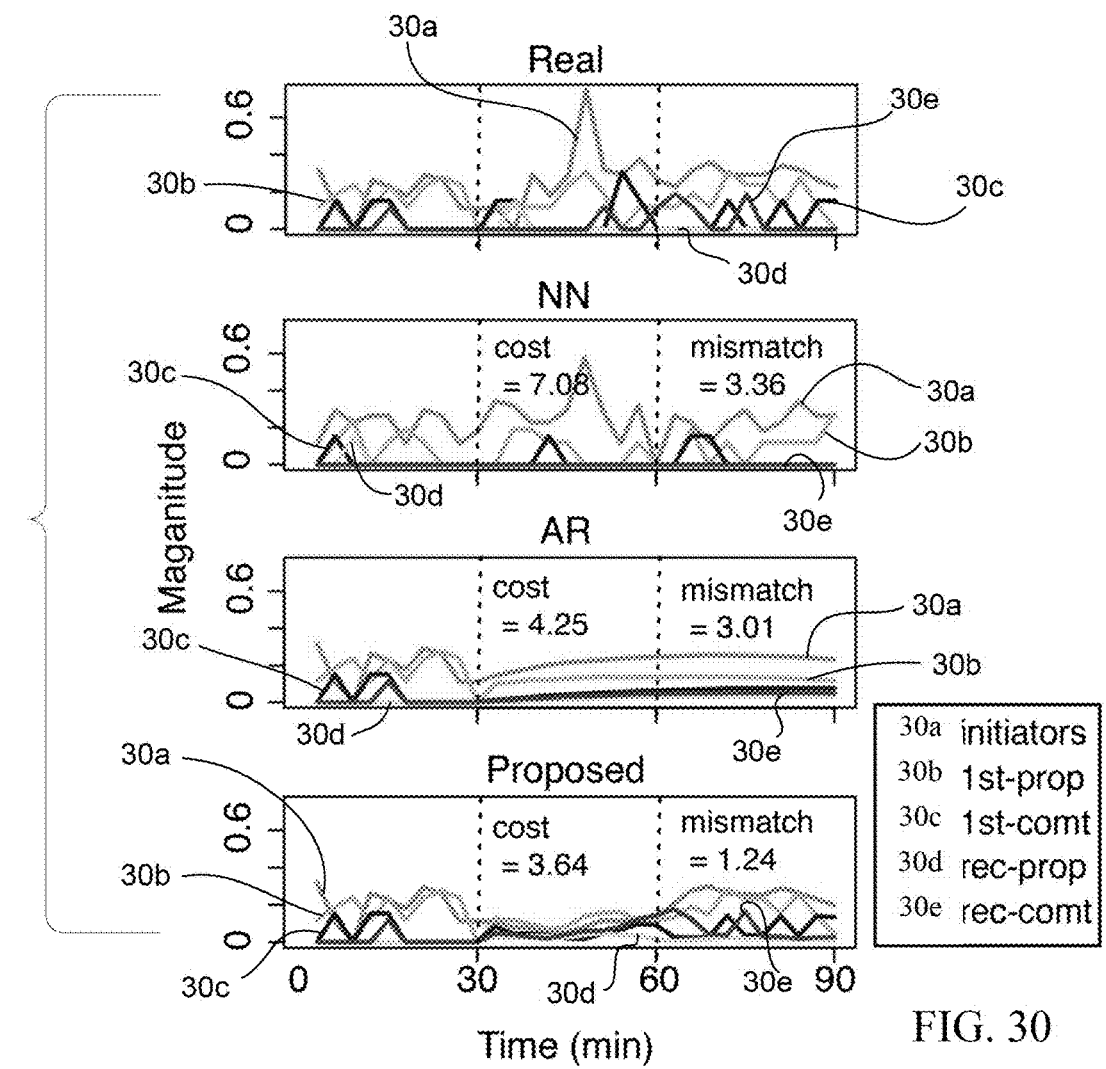
FIG. 30 contains graphs illustrating a case study of real versus suggested dynamics using different methods.

Case Study. To gain further insights, a test case was picked wherein all three methods produced valid solutions from the experiment of FIG. 29, and their suggested solutions are plotted in FIG. 30. For AR and the current method, since their solution only covers the last 60 minutes, their first 30 minutes are copied from the real case. From the real case, it is seen that it was rather sustained dynamics that seems to be full of interactions among different types of users. To compare among different solutions (i.e., NN, AR, and proposed), it is noted that the ideal pattern-matching should achieve both low cost during $t \in [30, 60]$ and low mismatch during $t \in [60, 90]$.

The solution produced by NN, although it seems to match the real case in its general shape, produces a moderate mismatch. Further, the cost of its suggested intervention is the highest among the three. AR, on the other hand, produces a very smooth dynamics that does not match the general shape of (the third part of) the real case, although the mismatch is quantitatively comparable to that of NN. Moreover, although its cost is relatively low, the dynamics do not look real: in fact, its solution validity $\gamma$ is 0.02, i.e., barely passes 0.

The current method produces a recommendation that best matches the third part of the real case, while also producing the lowest-cost intervention. A closer inspection shows that although the magnitude of the intervention dynamics (i.e., the second part) is generally low, it seems to consciously keep an interesting proportion and interaction among different types of users, i.e., initiators and first-time propagators around t=50, 1st-time commentators around t=55, and recurring commentators around t=65. This shows that the key features for successful dynamics engineering are not necessarily unique and may involve the interaction of multiple features. This is made possible because the proposed recommendation explicitly uses the patterns (i.e., the filters W's in Equations 21 and 18) at different temporal scales that are learned directly from data. Consequently, the current method is able to recommend low-cost, good-matching solutions while still making the suggested dynamics follows the intrinsic temporal dependencies from the data.

Experiment 2: Profit Maximization

In the second experiment, i.e., profit maximization, the observation $X_i$ of every test sample was given, and the aim was at maximizing the long-term popularity (reward) $\|V\|_1$ with minimum cost $\|U\|_1$. Again, dynamics engineering was conducted using all test samples and the resulting validity, cost, and reward were analyzed.

Figure 31:
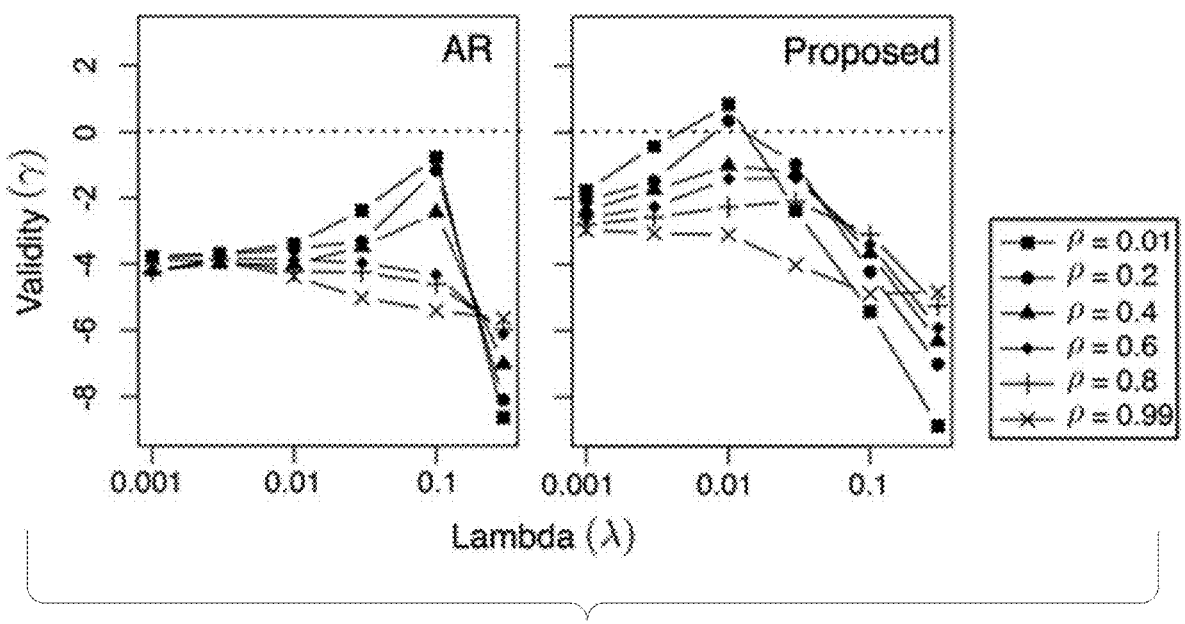
FIG. 31 contains graphs illustrating influence of $\lambda$ on solution validity $\gamma$ using different values of $\rho$.

Validity ($\gamma$) vs. $\lambda$. FIG. 31 presents the effects of different values of $\lambda$ on the average solution validity $\gamma$, where the dotted horizontal lines marks $\gamma=0$ (above which the solution is considered valid). There are two observations in FIG. 31 that are consistent with FIG. 27. First, there is a range of $\lambda$ that produces valid solutions; the lower $\rho$ is, the easier to produce valid solutions. Since a lower $\rho$ puts more emphasis on reward instead of cost (see Equation 20), it suggests that the key to produce good solutions is putting a low (numerical) weight on cost. Second, the current method outperforms the AR baseline in terms of validity, indicating that the current method produces a lot more valid cases ($\gamma \geq 0$) compared to AR. This confirms that the current method incorporates RCBM that can effectively capture non-linear features, whereas AR is a linear model.

Interestingly, there are also three observations in FIG. 31 that are different from that of FIG. 27. First, the validity value $\gamma$ is generally smaller, indicating that as a task, profit maximization is more challenging than pattern matching. Second, the best $\lambda$'s that correspond to the highest $\gamma$'s are also about 10× smaller than that of FIG. 27. It suggests that in profit maximization, one must put more emphasis on the likelihood instead of the score in Equation 15. The range of $\lambda$ that is above zero ($\lambda \approx 0.01$) is much more narrow than the case of FIG. 27 ($\lambda \in [0.01, 1]$). This confirms that the task of profit maximization is more challenging than pattern matching.

Figure 32:
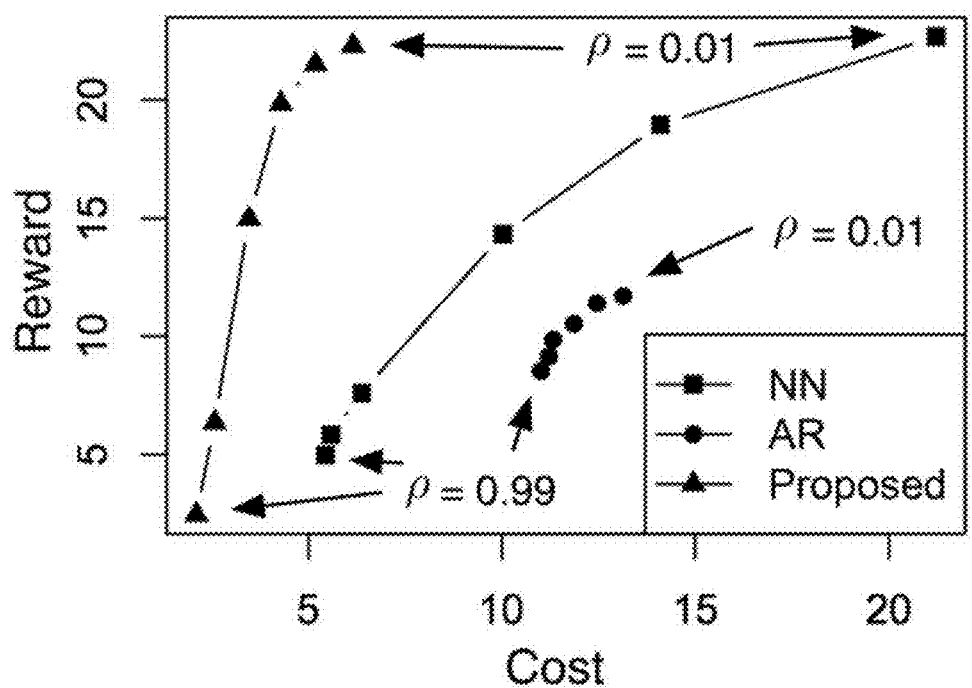
FIG. 32 is a graph illustrating tradeoff between cost and reward using different values of $\rho$.

Cost-Mismatch Tradeoff. In FIG. 32, the tradeoff of using different values of $\rho$ is further analyzed where $\lambda$ is selected using Equation 25. Again, in cases when there's no $\lambda$ that satisfies $\gamma(\lambda) \geq 0$, arg max$_\lambda$ $\gamma(\lambda)$ is selected instead. The results of average reward versus cost using all three methods are summarized in FIG. 32. For each method, the point in the upper-right corner corresponds to the case of $\rho=0.01$, whereas the point in the lower-left corresponds to the case of $\rho=0.99$. It is noted that, in general, the current method provides, again, that best overall tradeoff compared to NN and AR, which confirms that the selection of a good generative model is crucial for dynamics engineering. This is also consistent with the observations in FIG. 28.

Interestingly, there are also two observations in FIG. 32 that are somewhat different from the case of FIG. 28. First, while NN seems to be slightly better than AR in FIG. 28, it is significantly better in the case of FIG. 32. It indicates that, due to the increased difficulty of profit maximization (compared to pattern matching), AR becomes no longer useful. Second, the reward produced by the current method is comparable to that of NN, although the current method requires much less cost. This suggests that in profit maximization, reducing cost is much easier than increasing reward. This also makes intuitive sense: while it is hard to beat the "Ice Bucket Challenge" in popularity, it might be possible to engineer its marketing campaign such that the cost can be reduced.

Constrained Reward Minimization. To demonstrate the potential benefits of purposeful engineering, a slightly different setting is now used. While for each test sample i, the observation part $X_i$ is still given, an additional constraint is enforced that a solution must produce a cost that is at most half of the actual cost of sample i, i.e., $\|U_i\|_1$, on top of achieving $\gamma \geq 0$, to be considered a valid answer. This setting allows comparison of the performance of the profit-maximization algorithms, in terms of reward and cost, against what actually happened in reality.

Figure 33:
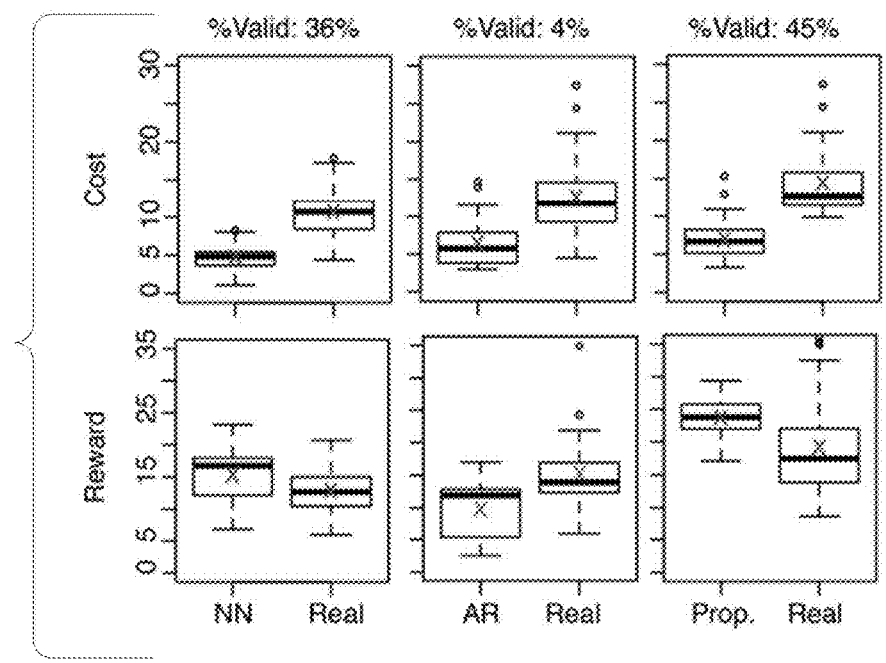
FIG. 33 contains graphs illustrating cost distribution of valid answers using different methods, wherein the cost distribution of each method is contrasted with that of the same set of samples in the real case, and the mean values are marked using crosses.

FIG. 33 summarizes the results; again, the fraction of valid answers are annotated at the top and the mean values are marked using crosses. From the figure, three observations can be made. First, the fractions of valid samples are significantly lower than the case of FIG. 29. Indeed, NN produces valid answers for 36% of the test samples, whereas the number is 4% for AR and 45% for the current method. This confirms that profit maximization is, in some sense, harder than pattern matching. Second, while all valid solutions from each of the three methods have an average cost lower than half of the corresponding real cases (per our experimental design), these methods result in different reward distributions. Indeed, AR, NN, and the current method produce lower, comparable, and higher rewards compared to the real cases, respectively. This confirms that the proposed approach outperforms the two baseline methods and further highlights the profit-maximization potential of the proposed dynamics-engineering method.

Figure 34:
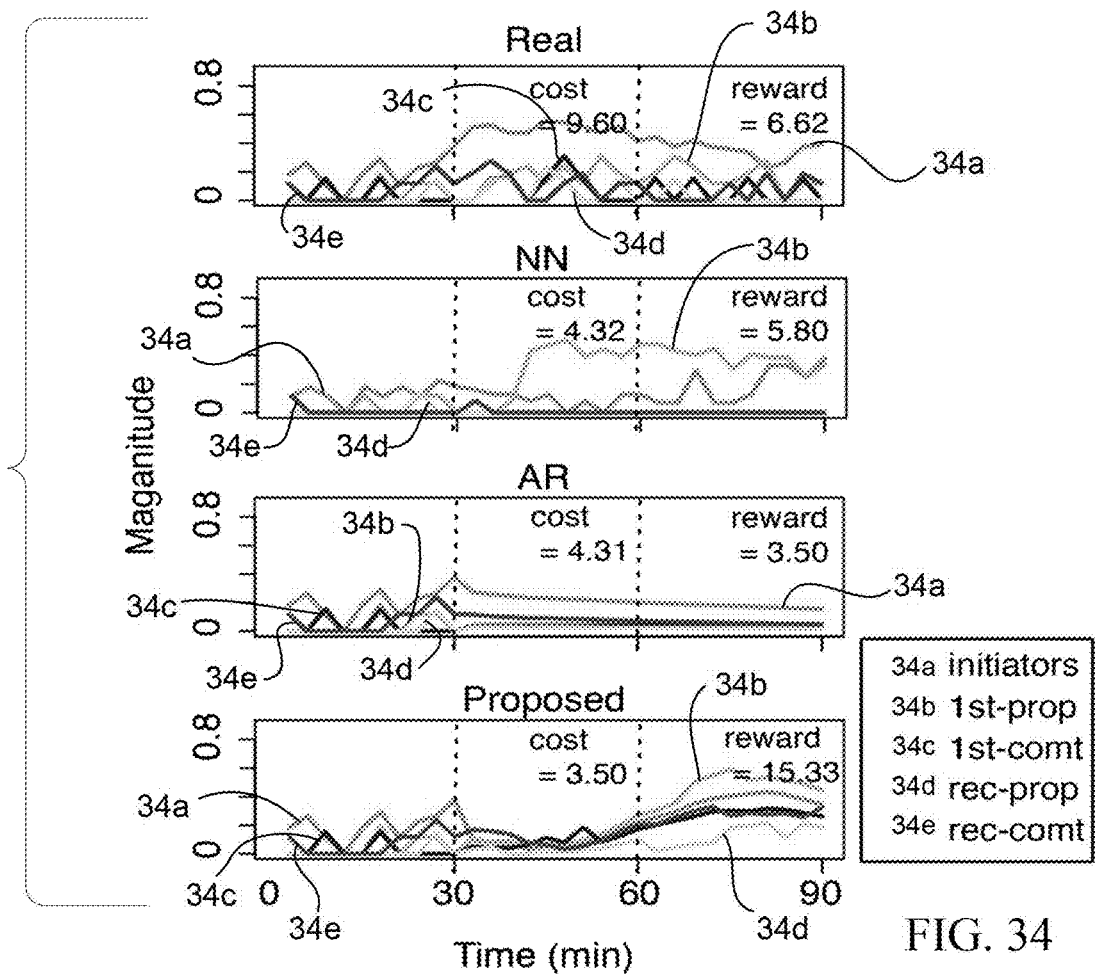
FIG. 34 contains graphs illustrating a case study of real versus suggested dynamics using different methods.

Case Study. To gain further insights, a test case was picked where all three methods produce valid solutions from the experiment of FIG. 33 and their suggested solutions are plotted in FIG. 34. All settings remain the same as the case of FIG. 30. To compare among different solutions (i.e., NN, AR, and Proposed), it is noted that the ideal profit maximization should achieve both low cost during $t \in [30, 60]$ and high reward during $t \in [60, 90]$.

From FIG. 33, it can be seen that, although the solutions from all three methods (NN, AR, and the current method) have costs lower than half of the real case, their rewards are quite different. For NN, the reward of its solution is comparable to that of the real case. Given that it also has a lower cost compared to the real case, this solution is not too bad. For AR, while the reward is even lower, the real issue is that the solution dynamics do not look real: in fact, its solution validity $\gamma \approx 0.004$, i.e., barely passes zero. Finally, the current method not only produces a recommendation that has a low cost, but also a reward higher than the real case. A closer inspection shows that although the magnitude of the intervention dynamics (i.e., the second part) is generally low, it seems to contain interesting interactions because the recommendation includes different key roles at different stages: recurring commentators (lines 34e in FIG. 34) around time t=35, first-time propagators (lines 34C in FIG. 34) around t=50, and then the dominating first-time propagators after t≥60. All these interactions reflect the patterns (i.e., the filters Ws in Equations 21 and 18) of different temporal scales that are learned directly from data. This is why the current method is able to recommend solutions with low cost and high reward, while still making the suggested dynamics follow the intrinsic temporal dependencies from the data.

Pattern Matching Versus Profit Maximization

The merits of the current pattern matching and profit maximization are quite different. Indeed, from FIG. 29, the current pattern matching is capable of producing valid solutions for 98% of the test samples, while reducing the cost by an average of 82% with a minor mismatch within 5%. On the other hand, from FIG. 33, the current profit minimization is capable of producing valid solutions for 45% of the test samples while improving the reward by an average of 27% with less than half of the original cost. Such a difference originates from the two tasks' different goals and formulations: pattern matching (Equation 19) aims at matching a given pattern with the lowest cost, whereas profit maximization aggressively maximizes reward and minimizes cost.

Further, such a difference in formulation implies a difference in the fundamental difficulties of two tasks. More importantly, profit maximization is significantly more difficult because while the "cost" has a natural lower bound (i.e., zero), the "reward," in principle, does not have any upper bound. In other words, unless the parameter $\lambda$ is assigned perfectly, it is very easy to either obtain an invalid solution or a low-score solution. Therefore, in many engineering cases (e.g., marketing promotion), although profit maximization may be more desirable, in practice, pattern matching may be more useful.

The above analysis is confirmed by the experimental results in two ways. First, by comparing FIG. 27 with FIG. 31, it is seen that it is significantly harder to generate a valid solution in profit maximization. Indeed, compared to the case of pattern matching (FIG. 27), the area above the horizontal line $\gamma \geq 0$ is much smaller in the case of profit maximization (FIG. 31). Also, compared to the case of pattern matching, the range of $\lambda$ that corresponds to $\gamma \geq 0$ ($\lambda \approx 0.01$) is much more narrow than the case of FIG. 27 ($\lambda \in [0.01, 1]$). This suggests it is harder to select a good value for the parameter $\lambda$ in the case of profit maximization. Second, by comparing FIG. 28 with FIG. 32, it is seen that while pattern matching is capable of reducing both cost and mismatch, profit maximization is more capable of achieving a reasonable reward using low cost, compared to achieving a very high reward using moderate cost. Indeed, from FIG. 32, it is seen that although the cost of the proposed solution is much lower than the case of the NN (i.e., nearest-neighbor) baseline, their highest possible rewards are only comparable.

These differences among the two tasks have practical implications on their real applications. First, if the ideal outcome pattern is given, pattern matching is the better option because according to FIG. 29, there is a 98% chance that a valid solution will be produced with low cost and mismatch. Second, if the ideal pattern is not given, then according to FIG. 33, there is a 45% chance that a valid solution will be produced. In this case, a moderately high reward with a low cost can be expected.

Exemplary Computer System

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 35:
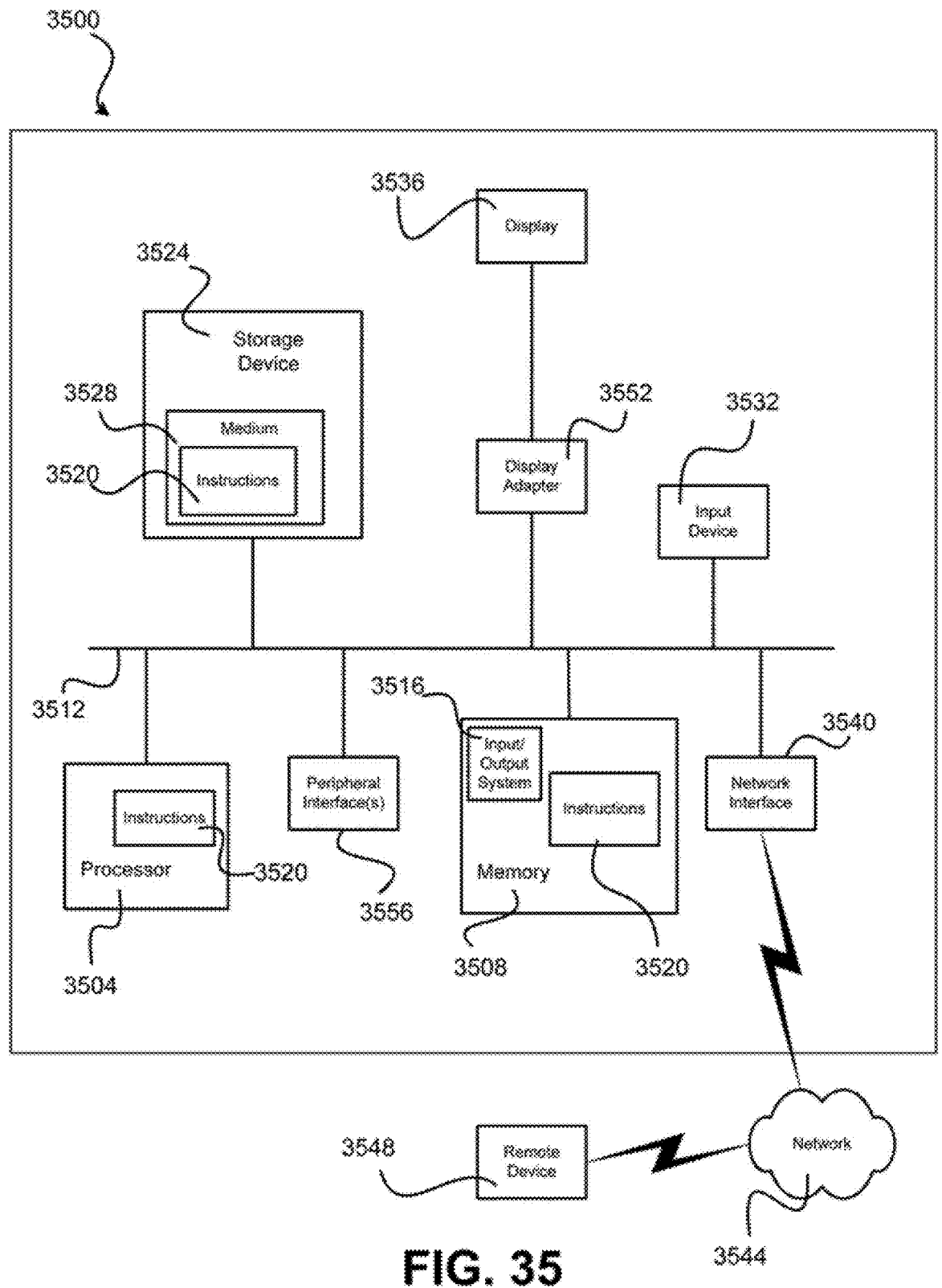
FIG. 35 is a high-level diagram of a computing system that can be used in performing any one or more of the methods disclosed herein.

FIG. 35 shows a diagrammatic representation of one embodiment of a computing device in the exemplary form of a computer system 3500 within which a set of instructions for causing a system, such as any one or more of computer network 212, social-media-data pattern-identification system 208, monitoring/analysis/intervention system 232, dynamic system 2604, outcome-dynamics-engineering system 2608, and outcome-dynamics-influencing system 2612 and/or portion(s) and/or combinations thereof, of FIGS. 2 and 26, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 3500 includes a processor 3504 and a memory 3508 that communicate with each other, and with other components, via a bus 3512. Bus 3512 may include any of several types of bus structures including, but not limited to, a memory bus, a memory controller, a peripheral bus, a local bus, and any combinations thereof, using any of a variety of bus architectures.

Memory 3508 may include various components (e.g., machine-readable media) including, but not limited to, a random access memory component, a read only component, and any combinations thereof. In one example, a basic input/output system 3516 (BIOS), including basic routines that help to transfer information between elements within computer system 3500, such as during start-up, may be stored in memory 3508. Memory 3508 may also include (e.g., stored on one or more machine-readable media)

instructions (e.g., software) 3520 embodying any one or more of the aspects and/or methodologies of the present disclosure. In another example, memory 3508 may further include any number of program modules including, but not limited to, an operating system, one or more application programs, other program modules, program data, and any combinations thereof.

Computer system 3500 may also include a storage device 3524. Examples of a storage device (e.g., storage device 3524) include, but are not limited to, a hard disk drive, a magnetic disk drive, an optical disc drive in combination with an optical medium, a solid-state memory device, and any combinations thereof. Storage device 3524 may be connected to bus 3512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 3524 (or one or more components thereof) may be removably interfaced with computer system 3500 (e.g., via an external port connector (not shown)). Particularly, storage device 3524 and an associated machine-readable medium 3528 may provide nonvolatile and/or volatile storage of machine-readable instructions, data structures, program modules, and/or other data for computer system 3500. In one example, software 3520 may reside, completely or partially, within machine-readable medium 3528. In another example, software 3520 may reside, completely or partially, within processor 3504.

Computer system 3500 may also include an input device 3532. In one example, a user of computer system 3500 may enter commands and/or other information into computer system 3500 via input device 3532. Examples of an input device 3532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 3532 may be interfaced to bus 3512 via any of a variety of interfaces (not shown) including, but not limited to, a serial interface, a parallel interface, a game port, a USB interface, a FIREWIRE interface, a direct interface to bus 3512, and any combinations thereof. Input device 3532 may include a touch screen interface that may be a part of or separate from display 3536, discussed further below. Input device 3532 may be utilized as a user selection device for selecting one or more graphical representations in a graphical interface as described above.

A user may also input commands and/or other information to computer system 3500 via storage device 3524 (e.g., a removable disk drive, a flash drive, etc.) and/or network interface device 3540. A network interface device, such as network interface device 3540, may be utilized for connecting computer system 3500 to one or more of a variety of networks, such as network 3544, and one or more remote devices 3548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 3544, may employ a wired and/or a wireless mode of communication. In general, any network topology may be used. Information (e.g., data, software 3520, etc.) may be communicated to and/or from computer system 3500 via network interface device 3540.

Computer system 3500 may further include a video display adapter 3552 for communicating a displayable image to a display device, such as display device 3536. Examples of a display device include, but are not limited to, a liquid crystal display (LCD), a cathode ray tube (CRT), a plasma display, a light emitting diode (LED) display, and any combinations thereof. Display adapter 3552 and display device 3536 may be utilized in combination with processor 3504 to provide graphical representations of aspects of the present disclosure. In addition to a display device, computer system 3500 may include one or more other peripheral output devices including, but not limited to, an audio speaker, a printer, and any combinations thereof. Such peripheral output devices may be connected to bus 3512 via a peripheral interface 3556. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computer-implemented method of determining patterns within a time-series social-media data set, the computer-implemented method comprising:
   receiving, by a social-media-data pattern-identification system, the time-series social-media data set;
   applying, by the social-media-data pattern-identification system, a deep-learning algorithm to the time-series social-media data set, wherein the deep-learning algorithm is designed and configured to analyze the time-series social-media data set for patterns across multiple time scales of differing lengths and to output pattern-identification data containing information on patterns in a plurality of the multiple time scales and across the plurality of the multiple time scales; and
   providing the output pattern-identification data to an output-interface of the social-media-data pattern-identification system;
   wherein the deep-learning algorithm comprises a recursive convolutional Bayesian model (RCBM) having a hierarchical structure that includes multiple convolutional Bayesian model (CBM) levels stacked with one another and configured to capture compositional structure of social dynamics across the multiple time scales, wherein:
   each of the multiple CBM levels has input dynamics and a plurality of activation vectors;
   adjacent pairs of the CBM levels each consist of a lower CBM level and a higher CBM level; and
   the input dynamics at the higher CBM level are constructed using the activation vectors of the lower CBM level so as to raise the level of abstraction of the higher CBM level relative to the lower CBM level in order to capture larger-time-scale dynamics at the higher CBM level relative to the lower CBM level.

2. The computer-implemented method according to claim 1, wherein each CBM level further includes a plurality of filter matrices, and each CBM level uses a convolutional operator that carries out a scale-and-copy task when convolving the filter matrices with the activation vectors.

3. The computer-implemented method according to claim 1, wherein the higher CBM level, is applied to output of the lower CBM level.

4. The computer-implemented method according to claim 1, wherein the deep-learning algorithm comprises a set of filter matrices and a corresponding set of the activation vectors applied to the time-series social-media data set, wherein solution for the filter matrices results in the output-identification data.

5. The computer-implemented method according to claim 1, wherein the deep-learning algorithm is applied to a particular application, and the applying of a deep-learning algorithm includes:
   setting an initial temporal resolution to be a finest resolution for the particular application; and
   using updating rules, learning relevant patterns, starting with the initial temporal resolution and iterating the learning using at least one increased temporal resolution.

6. The computer-implemented method according to claim 5, wherein each of the at least one increased temporal resolution is determined by max-pooling activation strength vectors.

7. The computer-implemented method according to claim 5, further comprising:
   determining whether a most recent one of the at least one temporal resolution is still relevant to the particular application;
   terminating the iterating when the most recent one of the at least one temporal resolution is not relevant to the application; and
   output patterns identified in all relevant ones of the initial temporal resolution and the at least one increased temporal resolution.

8. The computer-implemented method according to claim 1, wherein all of the multiple CBM levels share a common structure.

9. The computer-implemented method according to claim 8, wherein each of the multiple CBM levels has a set of a number, K, of the activation vectors, with K remaining the same across the multiple CBM levels.

10. The computer-implemented method according to claim 1, wherein the RCBM has a joint probability, and the deep-learning algorithm further comprises decomposing the joint probability using Bayes' rule.

11. The computer-implemented method according to claim 1, wherein the RCBM has been trained with external data using only a first one of the multiple CBM levels.

12. The computer-implemented method according to claim 11, wherein each of the multiple CBM levels beyond the first CBM level has been trained using a set of dynamics obtained by down-sampling a set of activation vectors from an immediately prior one of the multiple CBM levels.

13. The computer-implemented method according to claim 1, wherein the RCBM uses a convolutional operator that carries out a scale-and-copy task relative to each filter, W, and corresponding activation vector, h, of the RCBM.

14. The computer-implemented method according to claim 1, wherein the multiple CBM levels include a first CBM level, and training for differing levels of abstraction involves training each of the multiple CBM levels beyond the first CBM level using a set of dynamics obtained by down-sampling the activation vectors from an immediately prior one of the multiple CBM levels.

15. The computer-implemented method according to claim 1, wherein the input dynamics at the higher CBM level are constructed by down-sampling the activation vectors of the lower CBM level.

* * * * *